United States Patent [19]
Sato

[11] Patent Number: 5,285,335
[45] Date of Patent: Feb. 8, 1994

[54] CASSETTE TRANSFER UNIT

[75] Inventor: Keiji Sato, Kanagawa, Japan

[73] Assignee: Sony Corporation, Tokyo, Japan

[21] Appl. No.: 902,817

[22] Filed: Jun. 23, 1992

[30] Foreign Application Priority Data

Jun. 26, 1991 [JP] Japan .................................. 3-154476

[51] Int. Cl.5 .................................................. G11B 15/68
[52] U.S. Cl. .................................................. 360/92
[58] Field of Search ............... 360/92, 98.06; 414/932; 369/34, 36, 191, 192

[56] References Cited

U.S. PATENT DOCUMENTS

| 4,945,430 | 7/1990 | Konishi et al. | 360/92 |
| 4,984,108 | 1/1991 | Grant et al. | 360/92 |
| 5,016,127 | 5/1991 | Inoue et al. | 360/92 |
| 5,115,362 | 5/1992 | Harada et al. | 360/92 |
| 5,126,898 | 6/1992 | Komuro et al. | 360/92 |
| 5,128,912 | 7/1992 | Hug et al. | 369/34 |
| 5,182,687 | 1/1993 | Campbell et al. | 360/92 |

FOREIGN PATENT DOCUMENTS 243264  9/1989  Japan ...................................... 360/92

Primary Examiner—John T. Kwon
Attorney, Agent, or Firm—William S. Frommer; Alvin Sinderbrand

[57] ABSTRACT

A cassette transfer unit associated with a cassette container having a cassette placed therein at a first position for transferring the cassette from and into the cassette container. The cassette transfer unit comprises a cassette chamber for receiving the cassette at a second position, and a carrying device provided in the cassette chamber for carrying the cassette from the cassette container into the cassette chamber and from the cassette chamber into the cassette container. The carrying device includes a first mechanism having a gripping element unit slidable toward and away from the cassette container for retracting the cassette from the first position toward the cassette chamber to a third position, and a second mechanism a holding arm unit slidable toward and away from the cassette container for retracting the cassette away from the cassette container from the third position to the second position.

18 Claims, 29 Drawing Sheets

CASSETTE TRANSFER UNIT

BACKGROUND OF THE INVENTION

This invention relates to a cassette transfer unit associated with a cassette container for transferring a selected one of the cassettes from and into the cassette container.

Cassette autochangers have been used for a continuous tape cassette reproduction over a long period of time. Such a cassette autochanger includes a cassette container, a tape recorder/player unit, and a cassette transfer or carrying unit. The cassette container contains a number of tape cassettes placed in position within it. A plurality of tape recorder/player units may be juxtaposed in the cassette autochanger. The cassette carrying means includes a cassette holder for transferring a cassette between the cassette container and the tape recorder/player unit. The cassette holder has a cassette chamber into which a tape cassette is inserted from the cassette container or the tape recorder/player unit and from which the tape cassette is discharged into the cassette container or the tape recorder/player unit.

For example, Japanese Patent Kokai No. 1-243365 discloses a set of feed belts used to transfer a tape cassette into and from the cassette holder. However, this conventional arrangement is not reliable since the tape cassette is transferred merely by the function of the frictional forces between the tape cassette and the feed belts. In order to achieve ideal frictional forces, it is required to equalize the height of the tape cassette to that of the cassette chamber of the cassette holder. However, this is impossible in practice and some different exists between these heights. Furthermore, the ideal frictional forces cannot be obtained even when the heights are substantially the same if friction particles are produced between the tape cassette and the feed belts.

SUMMARY OF THE INVENTION

A main object of the invention is to provide an improved cassette transfer unit which can ensure stable cassette transfer operation.

There is provided, in accordance with the invention, a cassette transfer unit associated with a cassette container having a cassette placed therein at a first position for transferring the cassette from and into the cassette container. The cassette transfer unit comprises a cassette chamber for receiving the cassette at a second position, and a carrying device provided in the cassette chamber for carrying the cassette from the cassette container into the cassette chamber and from the cassette chamber into the cassette container. The carrying device includes first means slidable toward and away from the cassette container for retracting the cassette from the first position toward the cassette chamber to a third position. The carrying device also includes a second means slidable toward and away from said cassette container for retracting the cassette away from said cassette container from the third position to the second position.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
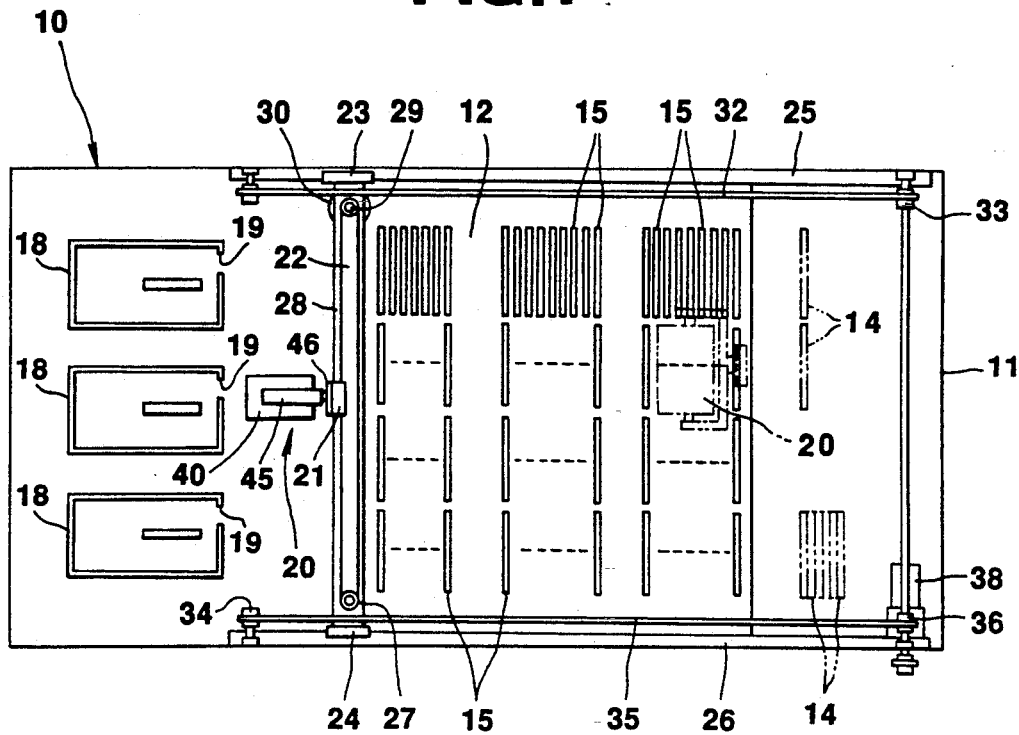
FIG. 1 is an elevational view showing one embodiment of a cassette autochanger made in accordance with the invention.
Figure 2:
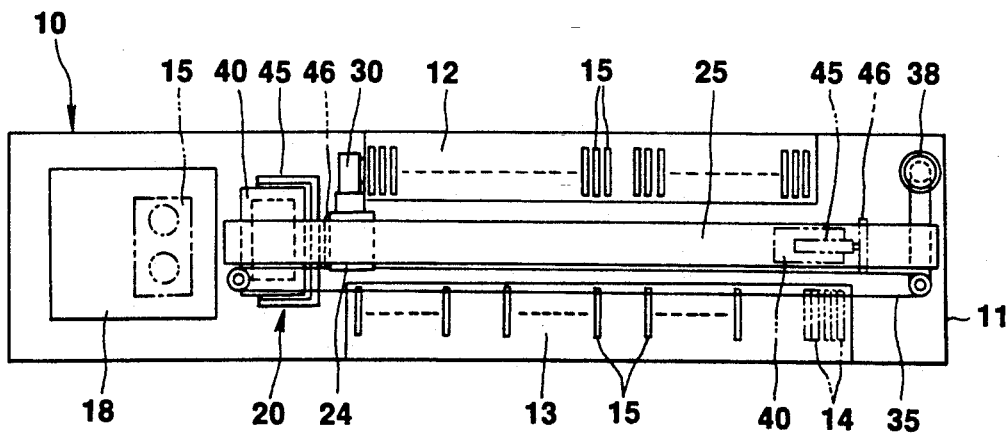
FIG. 2 is a plan view of the cassette autochanger of FIG. 1.
Figure 3:
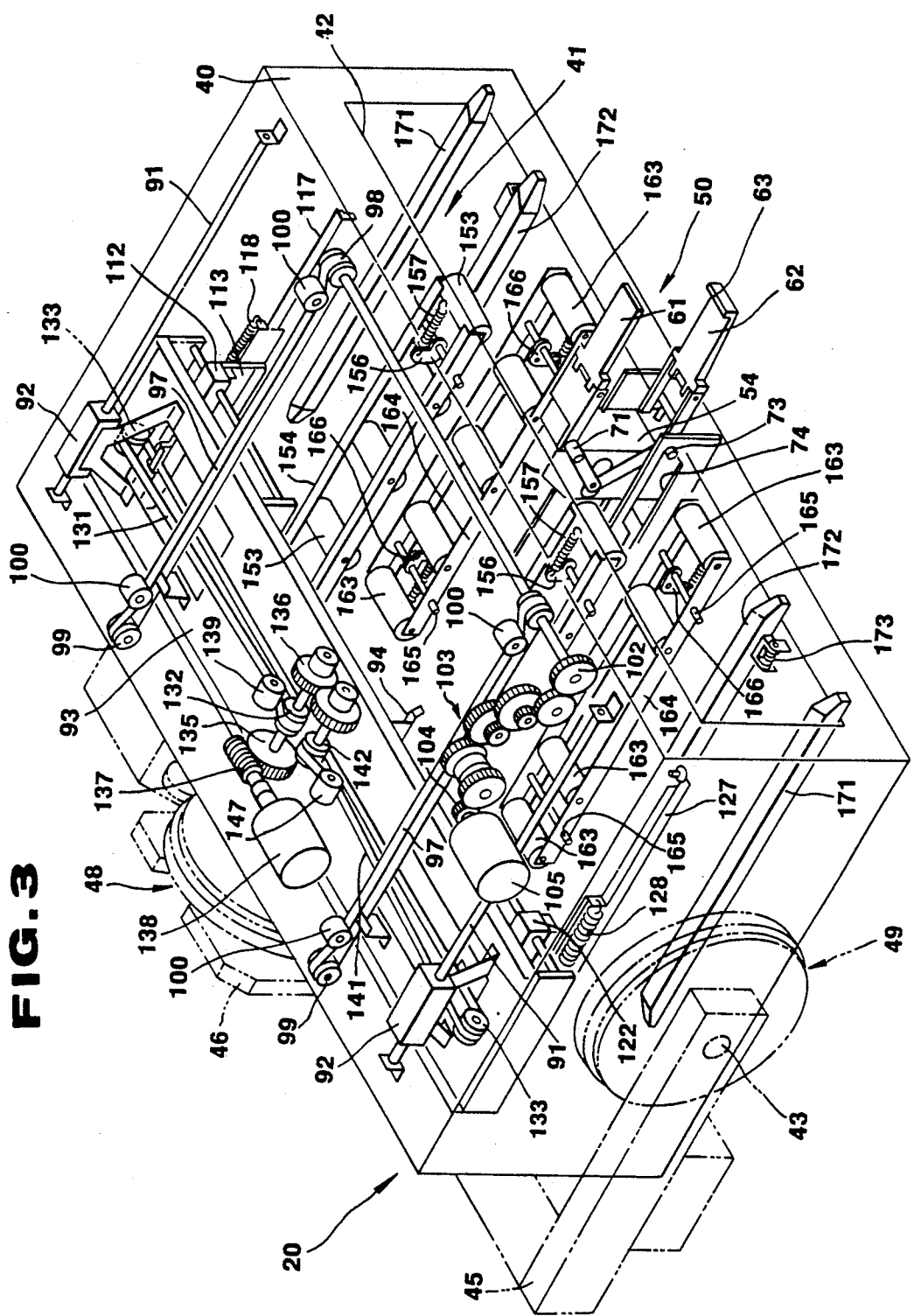
FIG. 3 is an enlarged perspective view showing the tape cassette holder used in the cassette autochanger of FIG. 1.

With reference to the drawings, wherein like numerals refer to like parts in the several views, and in particular to FIGS. 1 and 2, there is shown a tape cassette autochanger embodying the invention. The tape cassette autochanger, generally designated by the numeral 10, includes a housing 11 which contains two tape cassette containers 12 and 13 positioned in spaced parallel relation to each other. Each of the tape cassette containers 12 and 13 is shown as having a number of bins for containing a number of tape cassettes 15 placed therein in a vertical posture, and a number of vertically elongated rectangular ports 14 through which the respective tape cassettes 15 are placed into and drawn out of the tape cassette container. The housing 11 also contains a plurality of (in illustrated case three) tape recorder/player units 18 spaced in the vertical direction. Each of the tape recorder/player units 18 has a horizontally elongated rectangular cassette port 19 through which a tape cassette 15 is placed into and out of the tape recorder/player unit. The tape recorder/player unit 18 performs recording or reproducing for a tape cassette 15 positioned in a horizontal posture within the tape recorder/player unit.

A tape cassette carrier 20 is supported on a slider 21 which is slidable along a vertical guide rail 22. The vertical guide rail 22 is provided at its opposite ends with sliders 23 and 24 secured thereto. The sliders 23 and 24 are slidable along upper and lower horizontal guide rails 25 and 26, respectively. The upper guide rail 25 may be mounted on the ceiling of the housing 11, and the lower guide rail 26 may be mounted on the floor of the housing 11. The tape cassette carrier 20 is moved in vertical and horizontal directions in the space defined between the tape cassette containers 12 and 13.

To produce the upward and downward motion of the tape cassette carrier 20 along the vertical guide rail 22, the vertical guide rail 22 is provided at its lower end with a pulley 27 around which a drive belt 28 extends. The drive belt 28 also loops a pulley 29 fixed at the upper end of the vertical guide rail 22 to the output shaft of a drive motor 30. The opposite ends of the drive belt 28 are fixed on the opposite sides of the slider 21 on which the tape cassette carrier 20 is supported. To produce the leftward and rightward motion of the tape cassette carrier 20 between the horizontal guide rails 25 and 26, the horizontal upper guide rail 25 is provided at its one end with a pulley 31 around which a drive belt 32 extends. The drive belt 32 also loops a pulley 33 fixed at the other end of the horizontal upper guide rail 25. The opposite ends of the drive belt 32 are fixed on the opposite sides of the slider 23. Similarly, the horizontal lower guide rail 26 is provided at its one end with a pulley 34 around which a drive belt 35 extends. The drive belt 35 also loops a pulley 36 fixed at the other end of the horizontal lower guide rail 26 to the output shaft of a drive motor 38. The opposite ends of the drive belt 35 are fixed on the opposite sides of the slider 24. A connection rod 27 is connected between the pulleys 33 and 36 to transmit a drive from the drive motor 38 to the pulley 33.

Referring to FIGS. 3 to 7, the tape cassette carrier 20 includes a tape cassette holder 40 having a cassette chamber 41 formed therein for receipt of a tape cassette 15. The cassette holder 40 is formed in its one side surface with a rectangular cassette port 42 through which a tape cassette 15 is placed into and out of the cassette chamber 41. The tape cassette holder 40 is supported, through two shafts 43 fixed on the opposite sides thereof, on a U-shaped frame member 45 for free rotation about a longitudinal axis B (FIG. 4) with respect to the frame member 45. The frame member 45 is secured on a base member 46 for free rotation about a lateral axis A (FIG. 4) with respect to the base member 46 which in turn is carried on the slider 21. Thus, the tape cassette holder 40 can rotate about the axis A and also about the axis B with respect to the base member 46.

Figure 4:
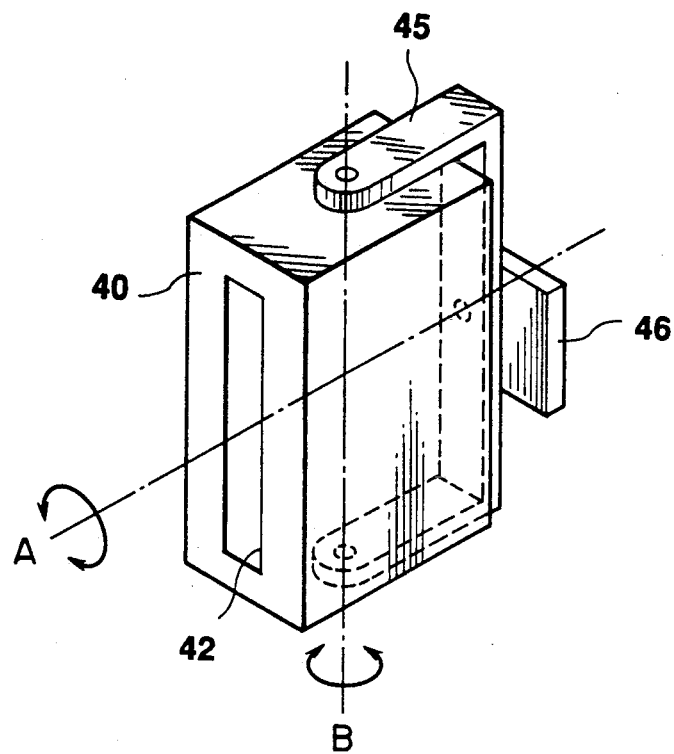
FIG. 4 is an enlarged perspective view of the tape cassette holder placed in its vertical center posture.
Figure 5:
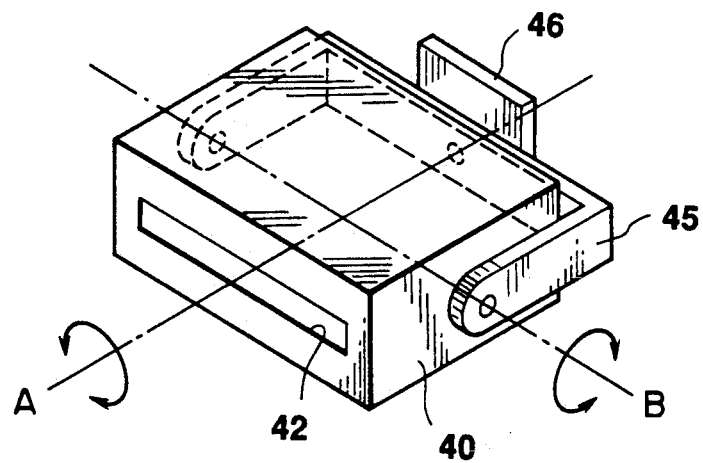
FIG. 5 is an enlarged perspective view of the tape cassette holder placed in its horizontal posture.

A first drive mechanism, generally designated by the numeral 48, is provided to rotate the frame member 45, along with the tape cassette holder 40 the rotation of the tape cassette holder 40 about the axis A with respect to the slider 21, from the vertical position illustrated in FIG. 4 to the horizontal position illustrated in FIG. 5 or from the horizontal position illustrated in FIG. 5 to the vertical position illustrated in FIG. 4. Similarly, a second drive mechanism, generally designated by the numeral 49, is provided to rotate the tape cassette holder 40 about the axis B with respect to the frame member 45 from the position illustrated in FIG. 6 to the position illustrated in FIG. 7 or from the position illustrated in FIG. 7 to the position illustrated in FIG. 6.

Figure 6:
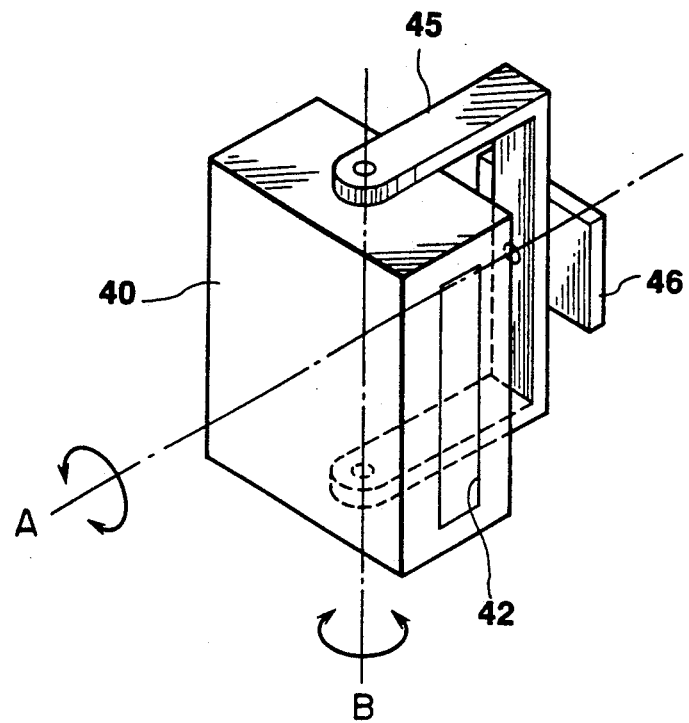
FIG. 6 is an enlarged perspective view of the tape cassette holder placed in its right vertical posture.
Figure 7:
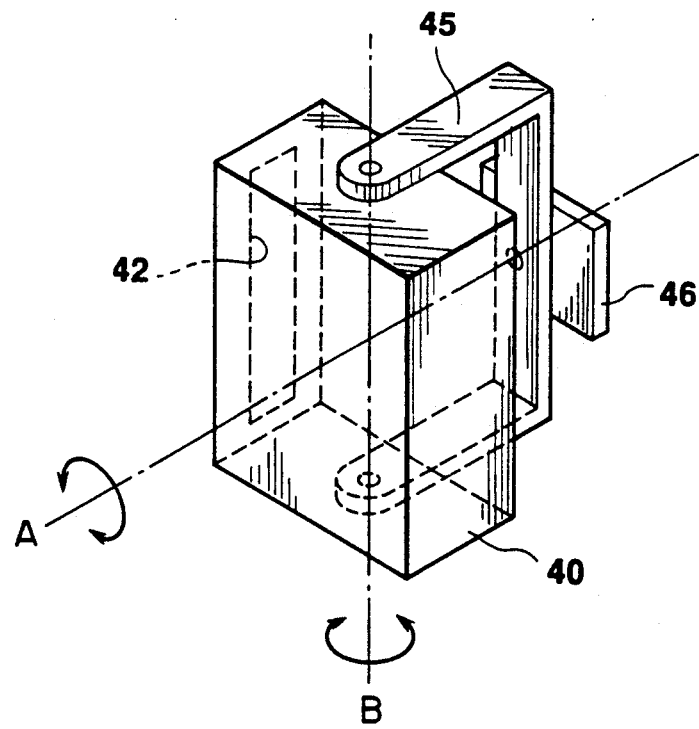
FIG. 7 is an enlarged perspective view of the tape cassette holder placed in its left vertical posture.
Figure 8:
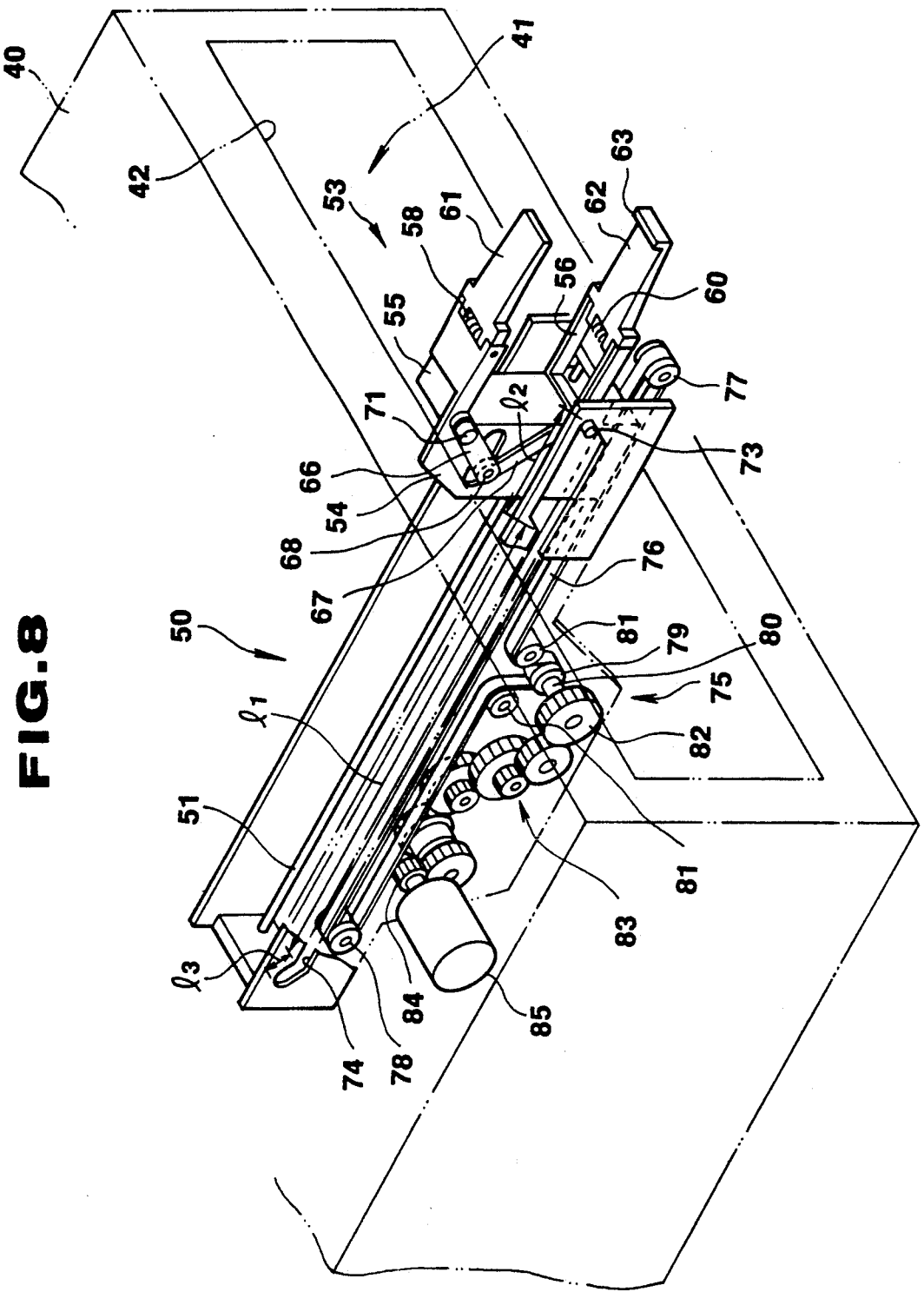
FIG. 8 is an enlarged perspective view showing a tape cassette transfer mechanism of the invention.

When the tape cassette carrier 40 is in a desired position as indicated by the broken lines of FIGS. 1 and 2, the control unit (not shown) produces a command operating the second drive mechanism 49 to rotate the tape cassette holder 40 in a direction about the axis B so as to bring its cassette port 42 into registry with the cassette port 14 through which a desired tape cassette 15 is transferred from the cassette container into the cassette holder 40. A sensor (not shown) detects the arrival of the tape cassette holder 40 at this position, as shown in FIGS. 6 or 7, and causes the control unit to stop the second drive mechanism 49. The tape cassette holder 40 employs a tape cassette transfer mechanism 50 to transfer the desired tape cassette 15 from the cassette container 12 or 13 into the tape cassette holder 40. After the desired tape cassette 15 is placed in the tape cassette holder 40, the control unit produces a command operating the second drive mechanism 49 to rotate the tape cassette holder 40 in the opposite direction about the axis B to its initial position. The sensor detects the arrival of the tape cassette holder 40 at its initial position, as shown in FIG. 4, and causes the control unit to stop the second drive mechanism 49. Thereafter, the control unit produces a command operating the drive motors 30 and 38 to move the tape cassette holder 40 toward a desired tape recorder/player unit 18. When the tape cassette holder 40 arrives at a desired position, the control unit produces a command operating the first drive mechanism 48 to rotate the tape cassette holder 40 about the axis A from the vertical posture as shown in FIG. 4 into the horizontal posture as shown in FIG. 5 so that the cassette port 42 comes into registry with the cassette port 19 of the desired tape recorder/player unit 18. A sensor (not shown) detects the arrival of the tape cassette holder 40 at this position and causes the control unit to stop the first drive mechanism 48. Then, the tape cassette transfer mechanism 50 operates to transfer the tape cassette 15 from the tape cassette holder 40 into the tape recorder/player unit 18.

After the recording or reproducing operation is completed for the tape cassette 15, the tape cassette transfer mechanism 50 operates to transfer the tape cassette 15 from the tape recorder/player unit 18 into the tape cassette holder 40. Following this, the control unit produces a command operating the first drive mechanism 48 to rotate the tape cassette holder 40 about the axis A from the horizontal posture as shown in FIG. 5 into the vertical posture as shown in FIG. 4. The sensor detects the arrival of the tape cassette holder 40 at this position and causes the control unit to stop the first drive mechanism 48. Then, the control unit produces a command operating the drive motors 30 and 38 to move the tape cassette holder 40 toward the initial position as indicated by the broken lines of FIGS. 1 and 2. Thereafter, the control unit produces a command operating the second drive mechanism 49 to rotate the tape cassette carrier 40 about the axis B so as to bring its cassette port 42 into registry with the cassette port 14. The sensor detects the arrival of the tape cassette holder 40 at this position and causes the control unit to stop the second driver mechanism 49. The tape cassette transfer mechanism 50 operates to transfer the tape cassette 15 from the tape cassette holder 40 into the initial position of the tape cassette container.

Figure 9:
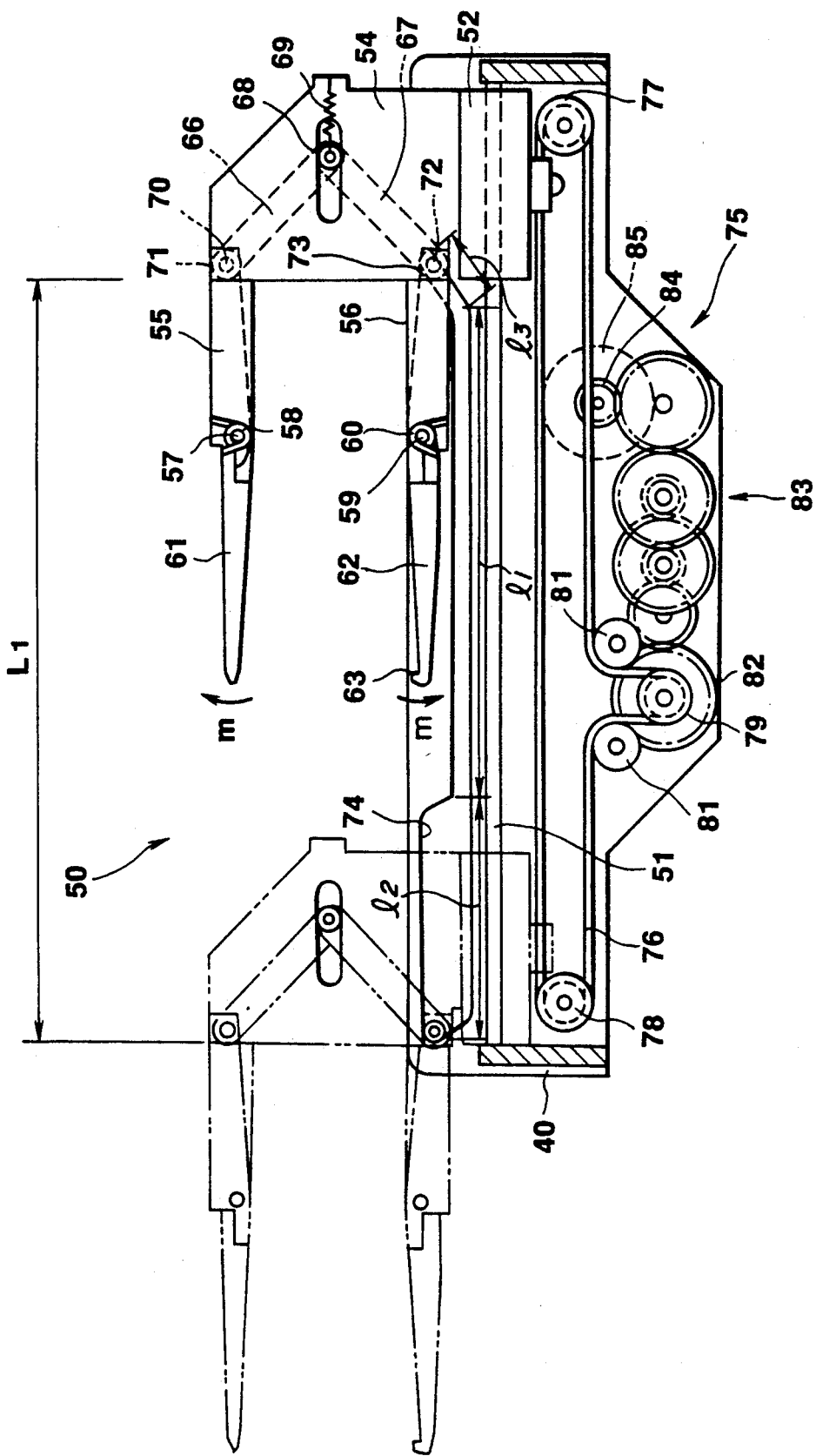
FIG. 9 is an enlarged side view of the tape cassette transfer mechanism of FIG. 8.
Figure 10:
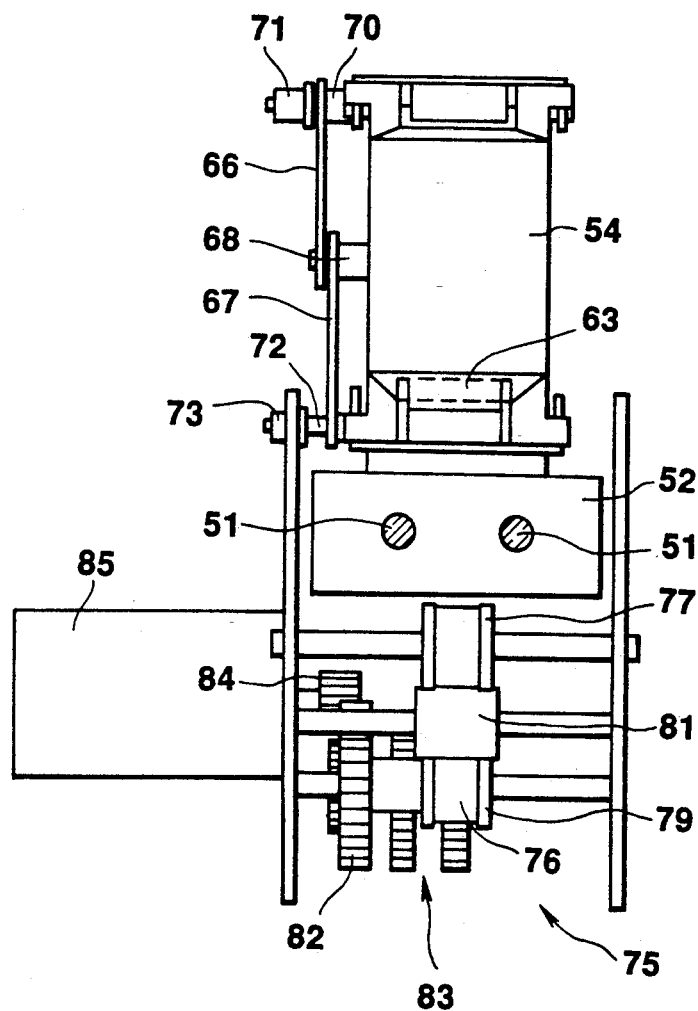
FIG. 10 is an enlarged elevational view of the tape cassette transfer mechanism of FIG. 8.
Figure 11:
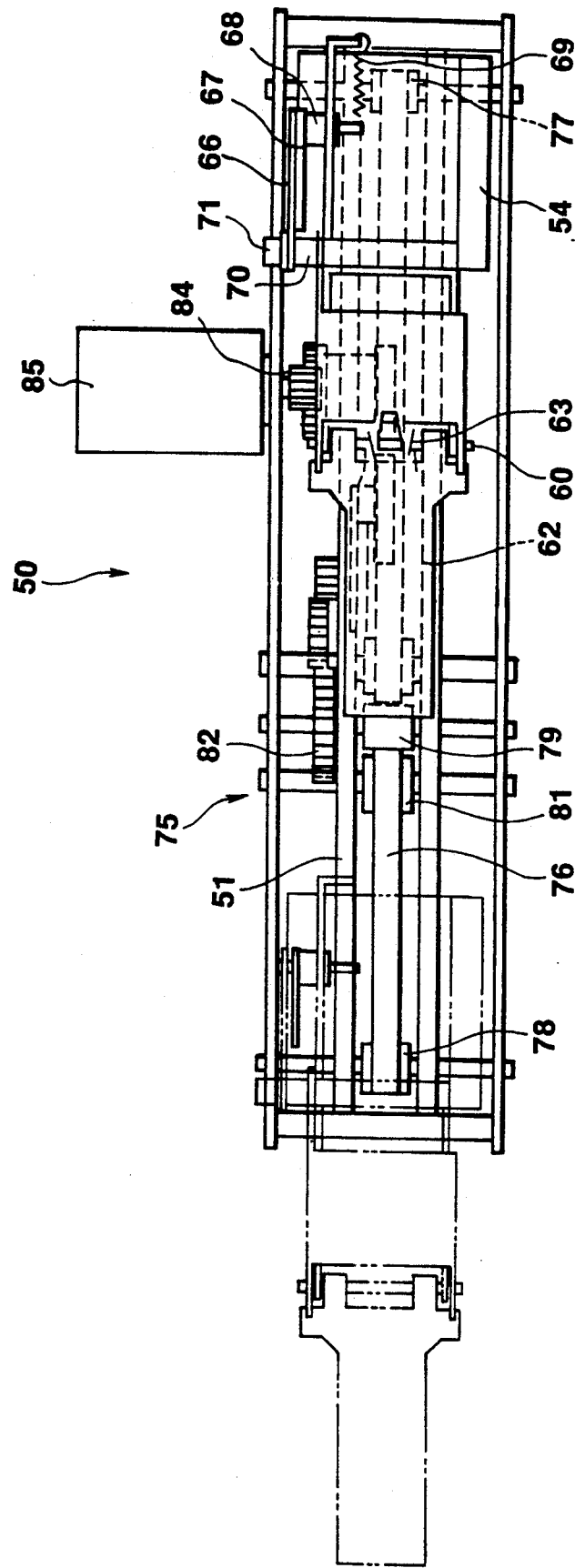
FIG. 11 is an enlarged plan view of the tape cassette transfer mechanism of FIG. 8.
Figure 12:
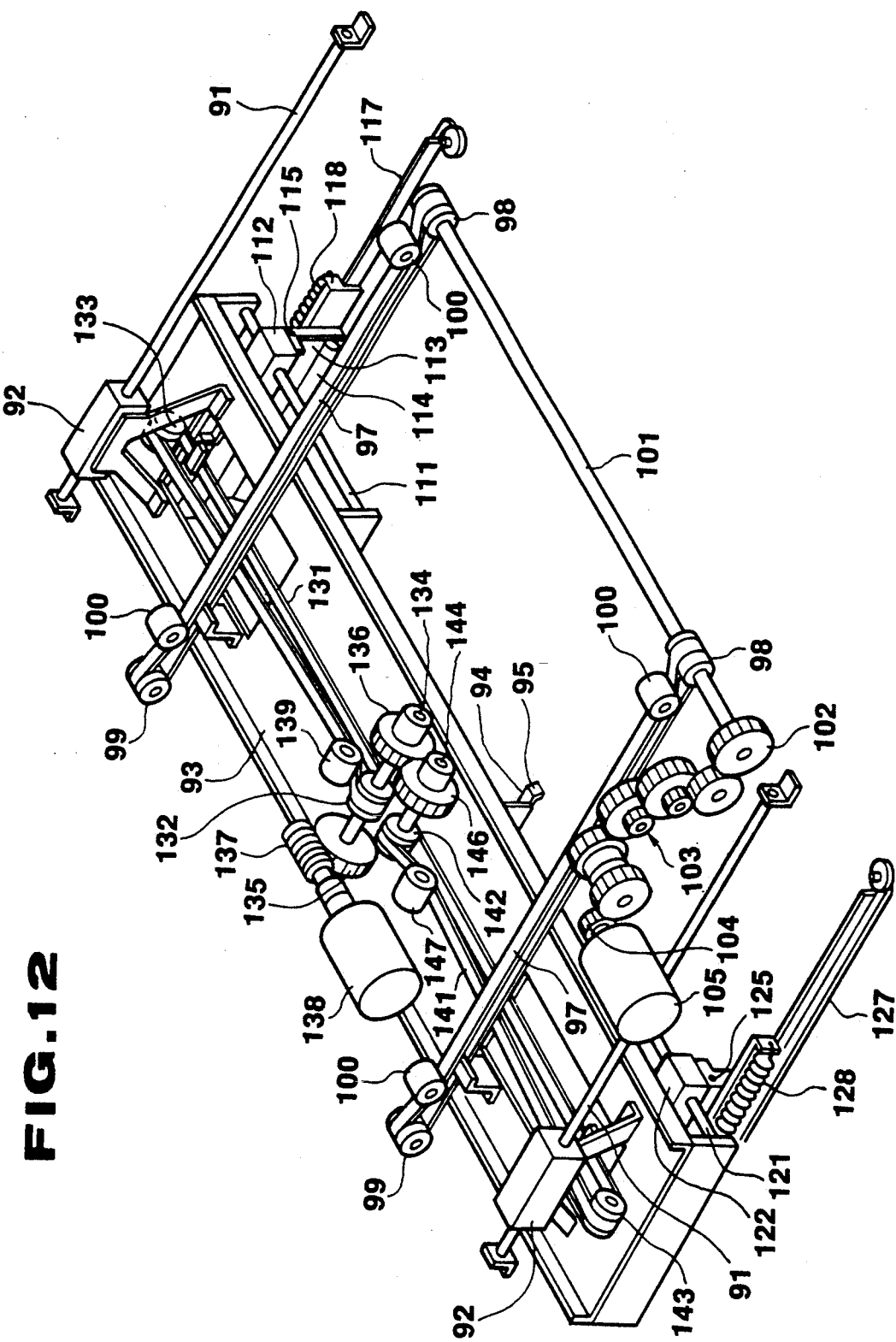
FIG. 12 is an enlarged perspective view showing the auxiliary tape cassette transfer mechanism of the invention.
Figure 13:
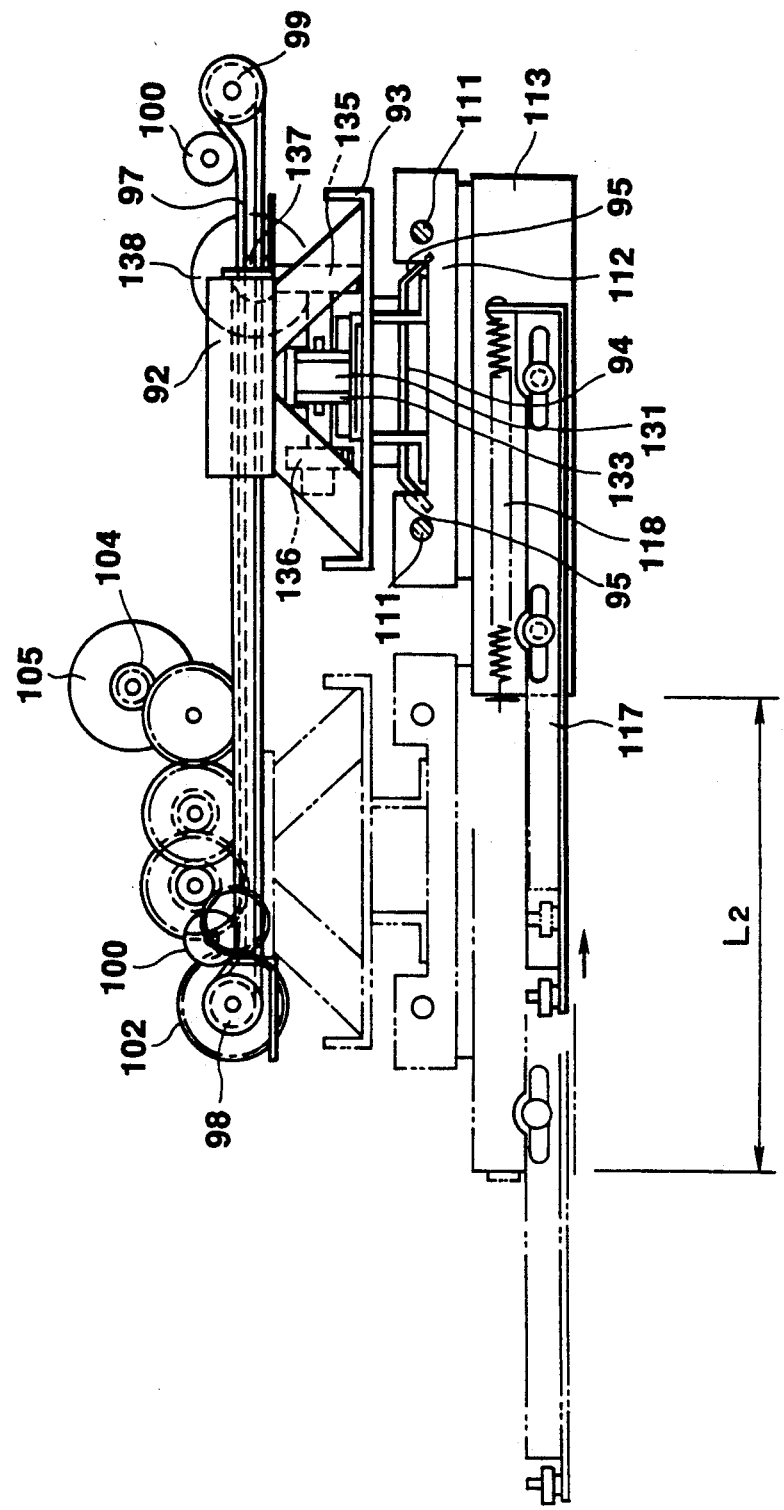
FIG. 13 is an enlarged side view showing the auxiliary tape cassette transfer mechanism of FIG. 12.
Figure 14:
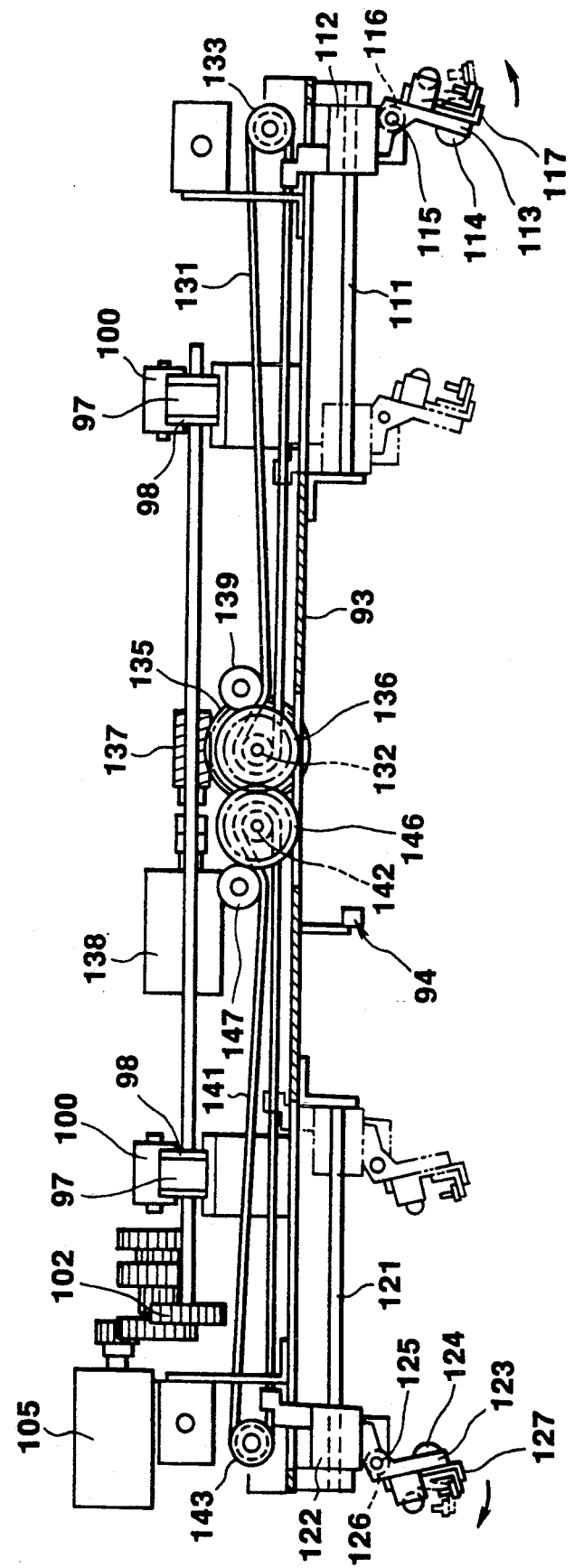
FIG. 14 is an enlarged elevational view showing the auxiliary tape cassette transfer mechanism of FIG. 12.
Figure 15:
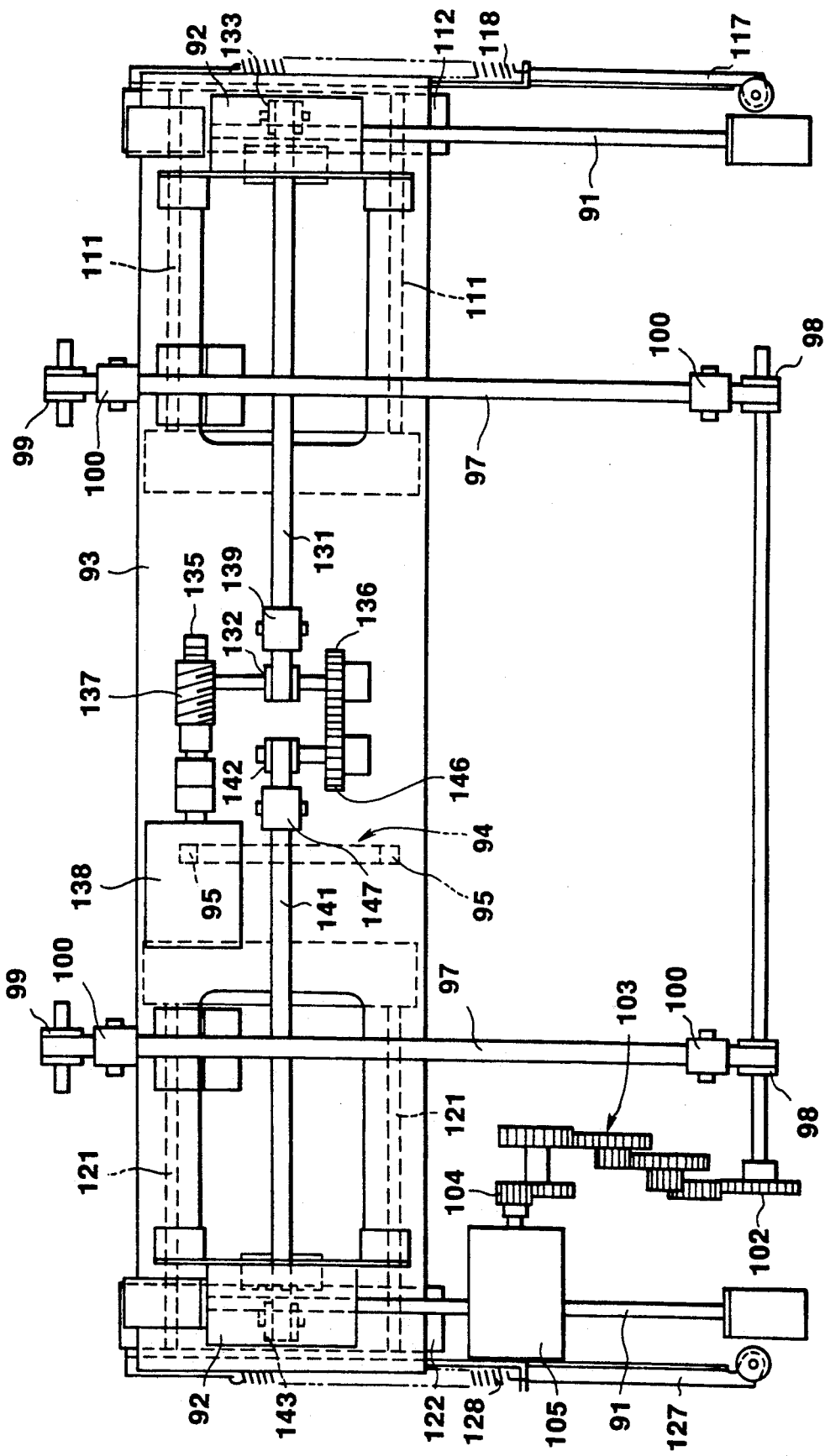
FIG. 15 is an enlarged plan view of the auxiliary tape cassette transfer mechanism of FIG. 12.

Referring to FIGS. 8 to 11, the tape cassette transfer mechanism 50 includes two guide rails 51 extending centrally in the cassette chamber 41 in the cassette retracting and extruding directions. The guide rails 51 has a slider 52 slidably supported thereon. A gripper 53 is carried on the slider 52 for movement in unison therewith along the guide rails 51. The gripper 53 includes a support member 54 fixedly supported on the slider 52. The support member 54 has upper and lower extensions 55 and 56, which extend forward in spaced-parallel relation to each other, for supporting upper and lower gripping elements 61 and 62. The upper gripping element 61 is pivoted intermediate its ends to the forward end of the upper extensions 55 by means of a shaft 57 on which a torsion coil spring 58 is journalled to urge the upper gripping element 61 in the direction indicated by the arrow m of FIG. 9. Similarly, the lower gripping element 62 is pivoted intermediate its ends to the forward end of the lower extension 56 by means of a shaft 59 on which a torsion coil spring 60 is journalled to urge the lower gripping element 62 in the direction indicated by the arrow m of FIG. 9. The lower gripping element 62 has a projection 63 extending upward from its free end for engagement with the recess or stepped portion formed in the lower surface of a tape cassette. The gripper 53 also includes a link mechanism comprised of two link members 66 and 67 pivoted at their one ends to each other by a shaft 68 engaged in a hole 69 elongated in the cassette retracting and extruding directions. A tension coil spring 32 is provided between the shaft 68 and the support member 54 to urge the shaft 68 into engagement with the rear end of the elongated hole 69. The other end of the link member 66 is pivoted to the rear end of the upper gripping element 61 by means of a shaft 70 on which a guide roller 71 is mounted for free rotation thereon. The other end of the link member 67 is pivoted to the rear end of the lower gripping element 62 by means of a shaft 72 on which a guide roller 73 is mounted for free rotation thereon. The guide roller 73 is inserted in a cam slot 74 of the shape, as best shown in FIG. 9, having an intermediate section $l_1$, a front end section $l_2$ and a rear end section $l_3$. The guide roller 73 is at a first height when it is in the intermediate section $l_1$ of the cam slot 74 and at a second height greater than the first height when it is in the front end section $l_2$ of the cam slot 74. The height of the guide roller 73 increases from the first height to the second height as the guide roller 73 moves along the rear end section $l_3$ of the cam slot 74 in the rearward direction.

A drive mechanism 75 is provided to move the gripper 53 forward and rearward along the guide rails 51. The drive mechanism 75 includes a drive belt 76 on which the slider 52 is fixedly secured. The drive belt 76 is journalled around two gears 77 and 78 provided in spaced-parallel relation below the guide rails 51 and also around a gear 79 secured on a shaft 80. A pair of rollers 81 are provided in pressure contact with the drive belt 76 to prevent slippage of the drive belt 76. The shaft 80 has a gear 82 fixed thereon for rotation in unison therewith. The gear 82 is drivingly connected through a reduction gear train 83 to a gear 84 fixed on the output shaft of a drive motor 85. The gripper 53 moves along the guide rails 51 between its rear position indicated by the full lines in FIG. 6 and the front position indicated by the phantom lines in FIG. 7 when a drive is transmitted from the drive motor 85.

Referring to FIGS. 12 to 15, the tape cassette transfer mechanism 50 also includes a pair of guide rails 91 provided in spaced-parallel relation to each other within the cassette chamber 41 and directed in the cassette retracting and extruding directions. Sliders 92, which are mounted on the respective guide rails 91 for sliding movement, carry a plate member 93 provided intermediate its ends with a guide plate 94. The guide plate 94 has inclined surfaces 95 at the opposite ends thereof for engagement with the guide roller 71 to change the height of the guide roller 71. The plate member 93 is fixed to two parallel drive belts 97 each of which is journalled around two gears 98 and 99 fixed in position above the plate member 93. Two rollers 100 are placed in pressure contact with each of the drive belts 97 to prevent slippage of the corresponding drive belt 97. The gears 98 are secured on a common shaft 101 which has a gear 102 fixed thereon for rotation in unison therewith. The gear 102 is drivingly connected through a reduction gear train 103 to a gear 104 fixed on the output shaft of a drive motor 105. The plate member 93 moves along the guide rails 91 between its rear position indicated by the full lines in FIG. 13 and its front position indicated by the phantom lines in FIG. 13 when a drive is transmitted from the drive motor 105.

The plate member 93 carries a first pair of guide rails 111 near its one end and a second pair of guide rails 121 near the other end thereof. The guide rails 111, which extend in a direction substantially normal to the guide rails 91, has a slider 112 supported for sliding movement thereon. An arm member 113 is pivoted to the slider 112 through a shaft 115 on which a torsion coil spring 116 is journalled to urge the arm member 113 to rotate in the direction indicated by the arrow of FIG. 14. The arm member 113 supports a pushing rod 117 for sliding movement between its retracted position indicated by the full lines of FIG. 13 and its extruded position indicated by the phantom lines of FIG. 13 to push the tape cassette 15 out of the cassette chamber 41. A coil spring 118 is provided to urge the pushing rod 116 toward its extruded (phantom line) position. The guide rails 121, which extend in a direction substantially normal to the guide rails 91, has a slider 122 supported for sliding movement thereon. An arm member 123 is pivoted to the slider 122 through a shaft 125 on which a torsion coil spring 126 is journalled to urge the arm member 123 to rotate in the direction indicated by the arrow of FIG. 14. The arm member 123 supports a pushing rod 127 for sliding movement between its retracted position indicated by the full lines of FIG. 13 and its extruded position indicated by the phantom lines of FIG. 13 to push the tape cassette 15 out of the cassette chamber 41. A coil spring 128 is provided to urge the pushing rod 126 toward its extruded (phantom line) position. Rubber members 114 and 124 are attached on the inner surfaces of the respective arm members 113 and 123 to certainly grip a tape cassette 15 placed in the cassette chamber 41 without the danger of damaging the opposite side surfaces of the tape cassette.

The slider 112 is fixed on a drive belt 131 journalled around two gears 132 and 133. The gear 132 is fixed on a shaft 134 which has a worm wheel 135 secured thereon at its one end thereof and a spur gear 136 secured thereon at the other end thereof. The worm wheel 135 is in mesh engagement with a worm gear 137 secured on the output shaft of a drive motor 138 carried on the plate member 93. A roller 139 is positioned in pressure contact with the drive belt 131 to prevent slippage of the drive belt 131. The slider 121 is fixed on a drive belt 141 journalled around two gears 142 and 143. The gear 142 is fixed on a shaft 144 which has a spur gear 146 secured thereon. The spur gear 146 is held in mesh engagement with the spur gear 136. A roller 147 is positioned in pressure contact with the drive belt 141 to prevent slippage of the drive belt 141. When a drive is transmitted from the drive motor 138, the drive belts 131 and 141 move in the opposite directions to bring the respective arm members 113 and 123 between the full line position of FIG. 14 and the phantom line position of FIG. 14.

Figure 16:
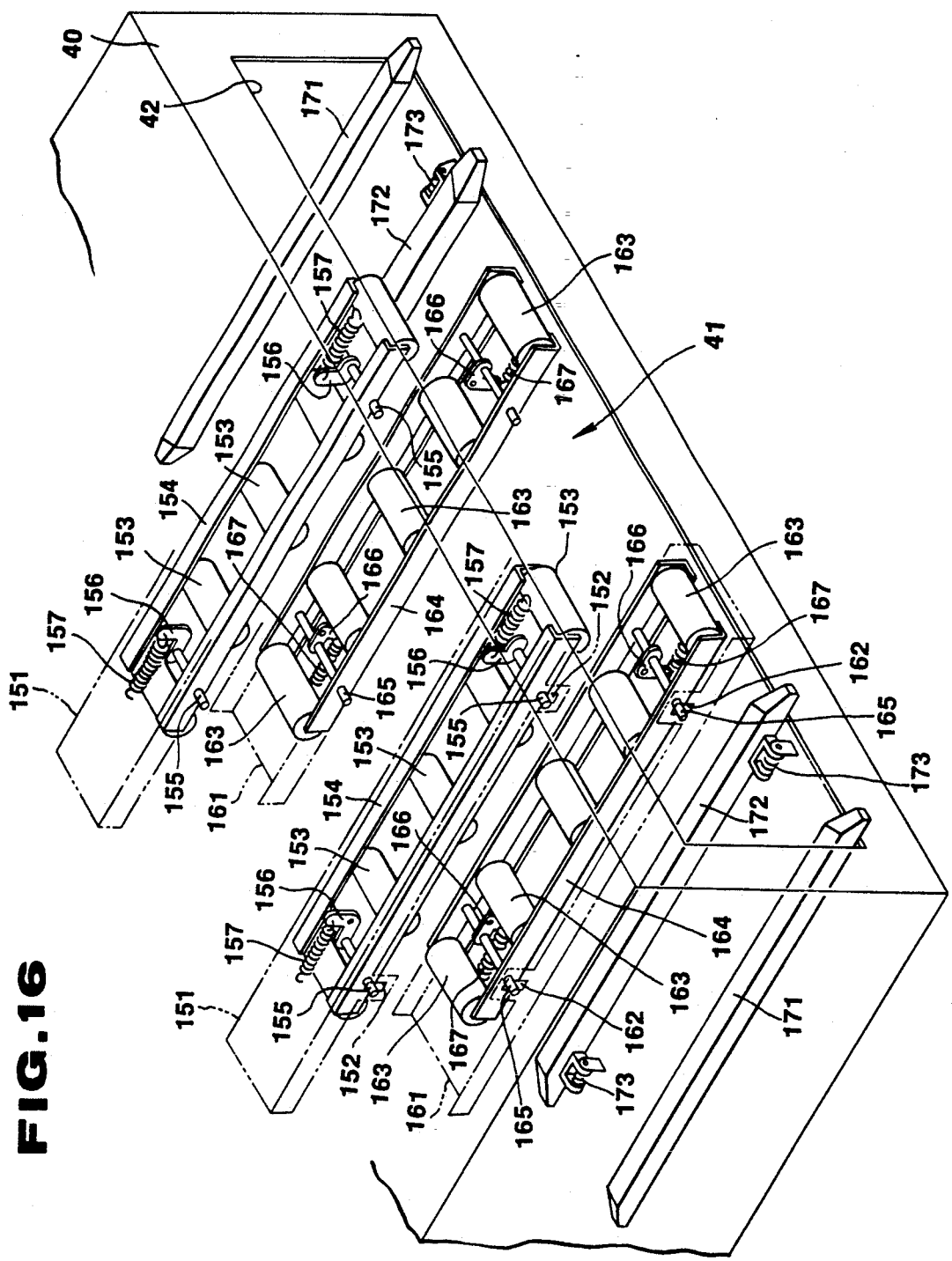
FIG. 16 is an enlarged perspective view showing the roller guide mechanism of the invention.
Figure 17:
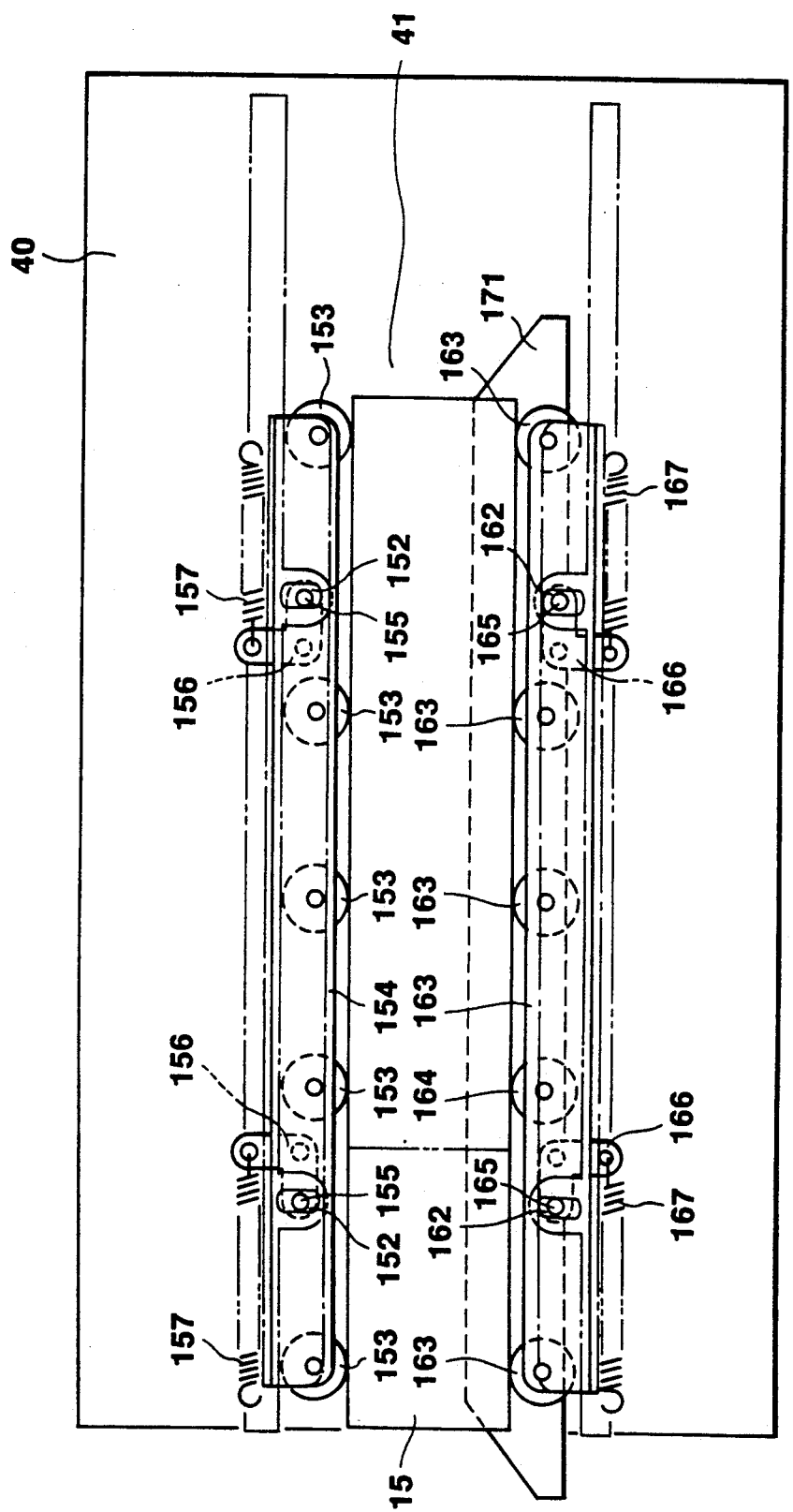
FIG. 17 is an enlarged side view of the roller guide mechanism of FIG. 16.
Figure 18:
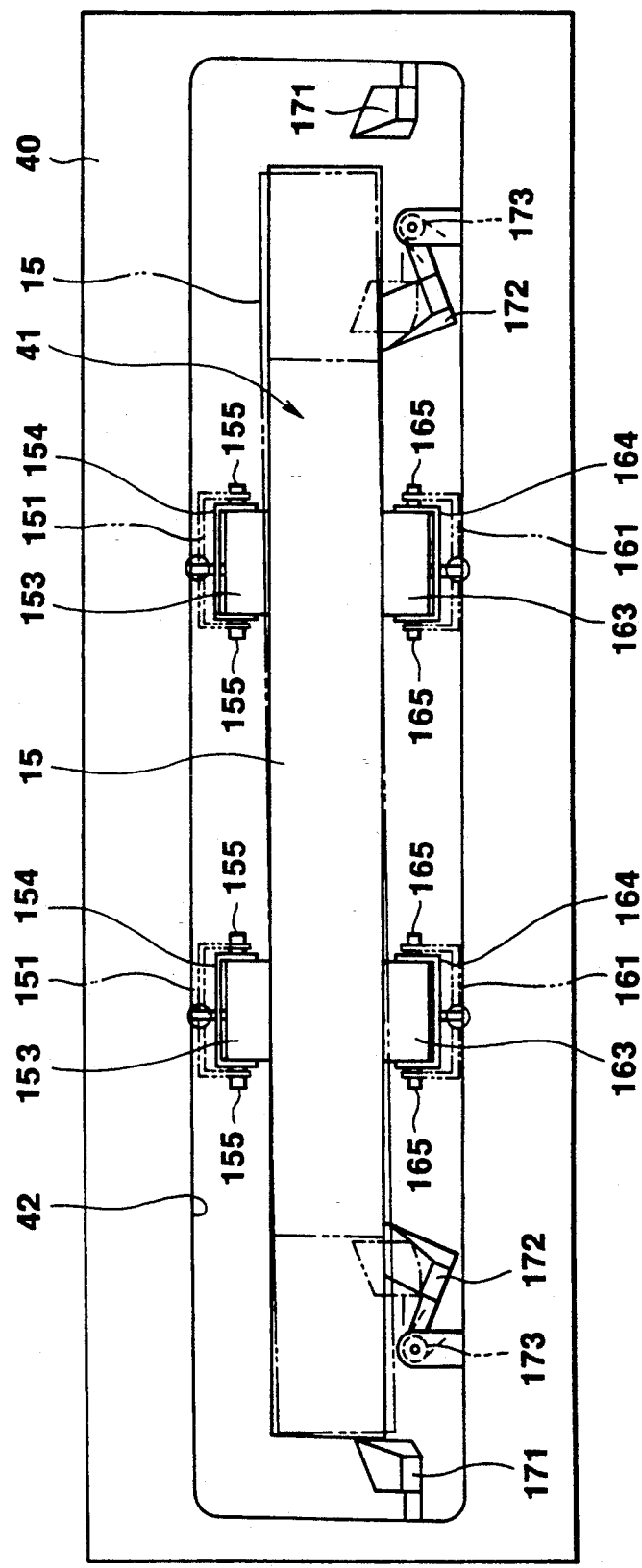
FIG. 18 is an enlarged elevational view of the roller guide mechanism of FIG. 18.

Referring to FIGS. 16 to 18, the tape cassette transfer mechanism 50 also includes two roller guides which are substantially the same in structure. The roller guides have upper and lower mounting members 151 and 161 positioned in spaced-parallel relation to each other within the cassette chamber 41. The upper mounting member 151 is mounted on the ceiling of the cassette chamber 41 and it has turned side flanges each of which is formed near its front and rear ends with elongated holes 152. A plurality of rollers 153 are supported for free rotation between two parallel roller frames 154 which in turn are supported on the upper mounting member 151 by means of two shafts 155 extending through the roller frames 154 and also through the elongated holes 152. The shafts 155 are loosely inserted in the elongated holes 152 to permit upward and downward movement of the roller frames 154 with respect to the upper mounting member 151, as shown in FIG. 18. An L-shaped lever member 156 has its center pivoted to the roller frames 154 and its one end secured on each of the pins 155. The other end of the lever member 156 is connected to one end of a coil spring 157 the other end of which is fixed to the upper mounting member 151 to urge the roller frames 154 to the full line position of FIG. 18. Similarly, the lower mounting member 161 is mounted on the floor of the cassette chamber 41 and it has turned side flanges each of which is formed near its front and rear ends with elongated holes 162. A plurality of rollers 163 are supported for free rotation between two parallel roller frames 164 which in turn are supported on the lower mounting member 161 by means of two shafts 165 extending through the roller frames 164 and also through the elongated holes 162. The shafts 165 are loosely inserted in the elongated holes 162 to permit upward and downward movement of the roller frames 164 with respect to the lower mounting member 161, as shown in FIG. 18. An L-shaped lever member 166 has its center pivoted to the roller frames 164 and its one end secured on each of the pins 165. The other end of the lever member 166 is connected to one end of a coil spring 167 the other end of which is fixed to the lower mounting member 161 to urge the roller frames 164 to the full line position of FIG. 18. The distance between the frontmost guide rollers 153 and 163, which are positioned near the cassette port 42, is somewhat shorter than the thickness of the tape cassette 15. The front guide rollers are supported to move away from each other when pushed by the cassette inserted into the cassette member. A first pair of guide members 171 are provided in spaced-parallel relation to each other within the cassette chamber 41 for guiding a large-sized tape cassette therebetween without the danger of rotating the tape cassette. The guide members 171 are fixed in position with respect to the cassette holder 40. The guide members 171 are tapered at the opposite ends thereof for easy engagement with a tape cassette. A second pair of guide members 172 are provided in spaced-parallel relation to each other within the cassette chamber 41 for guiding a small-sized tape cassette therebetween without the danger of rotating the tape cassette. Thus, tape cassettes having different sizes can be accommodated within the cassette chamber 41. The guide members 172 are tapered at the opposite ends thereof for easy engagement with a tape cassette. The guide members 172 are pivoted to the cassette holder 40 for rotating between the retracted position indicated by the full lines of FIG. 18 and the extruded position indicated by the phantom lines of FIG. 18. Torsion coil springs 173 are provided to urge the respective guide members 120 toward the phantom line position.

Figure 19:
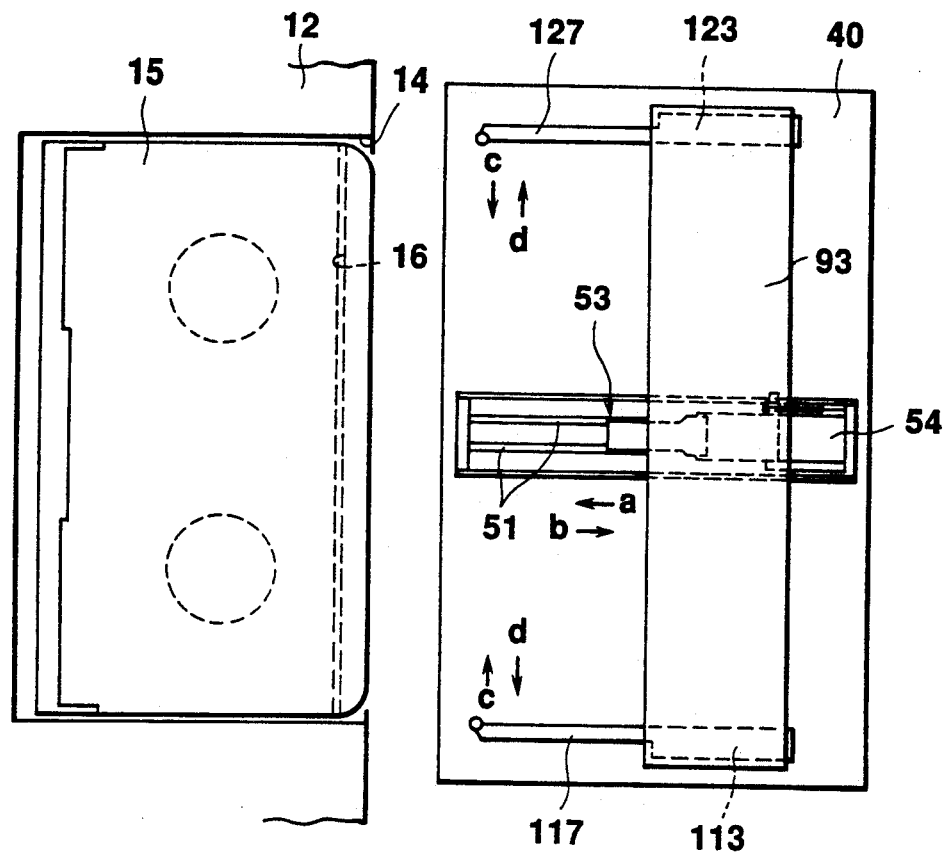
FIG. 19 is an enlarged side view used in explaining the cassette retracting operation of the invention.
Figure 20:
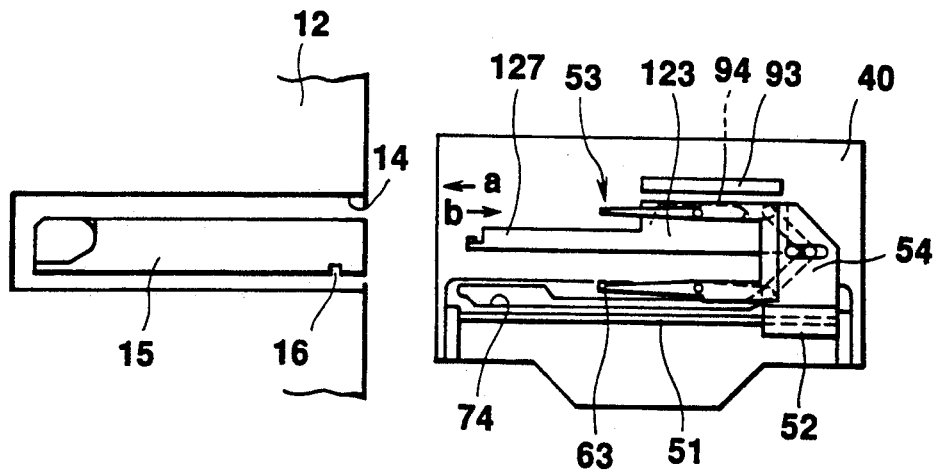
FIG. 20 is an enlarged plan view used in explaining the cassette retracting operation of the invention.
Figure 21:
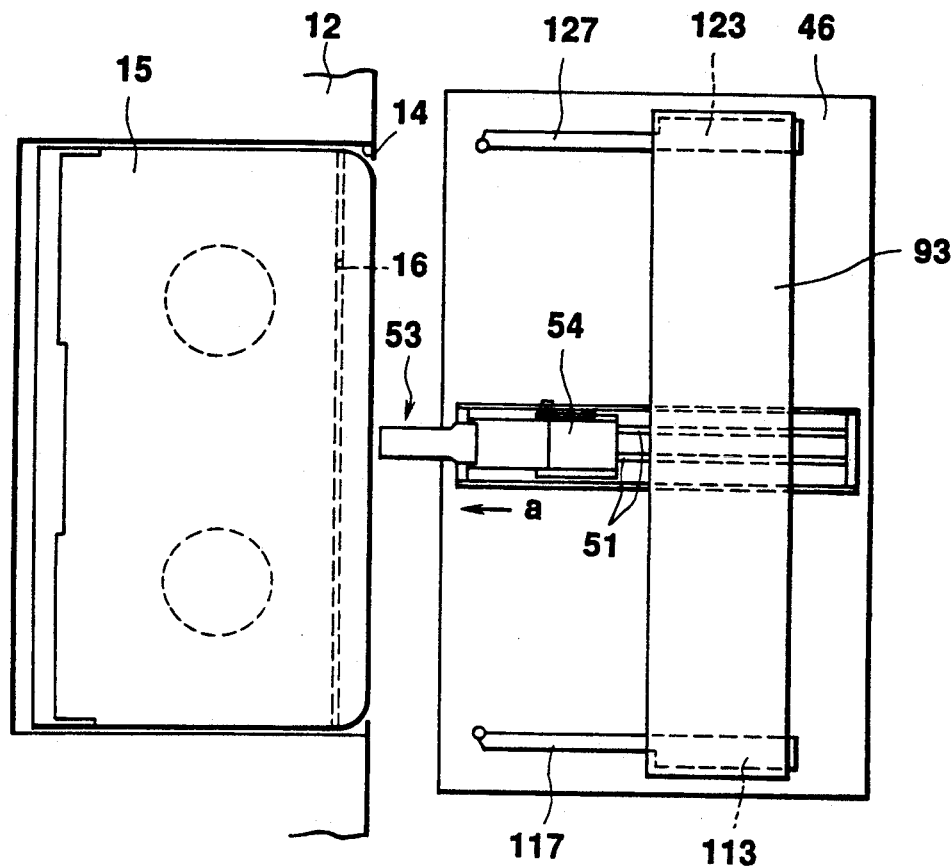
FIG. 21 is an enlarged side view used in explaining the cassette retracting operation of the invention.
Figure 22:
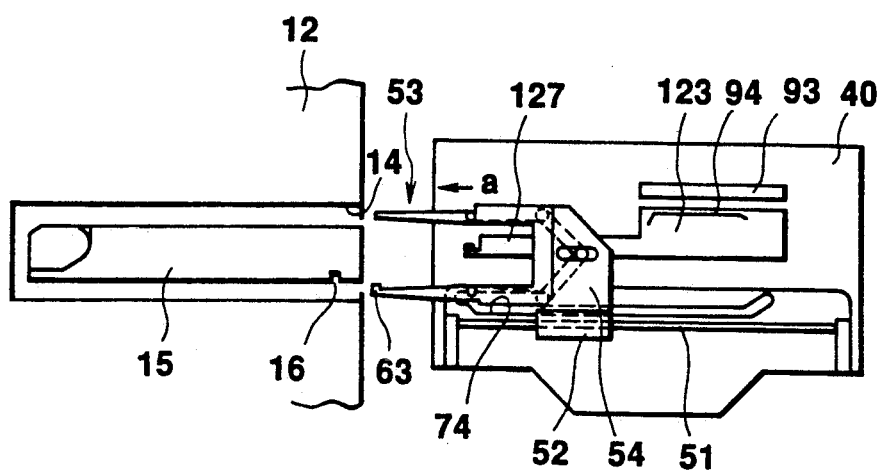
FIG. 22 is an enlarged plan view used in explaining the cassette retracting operation of the invention.
Figure 23:
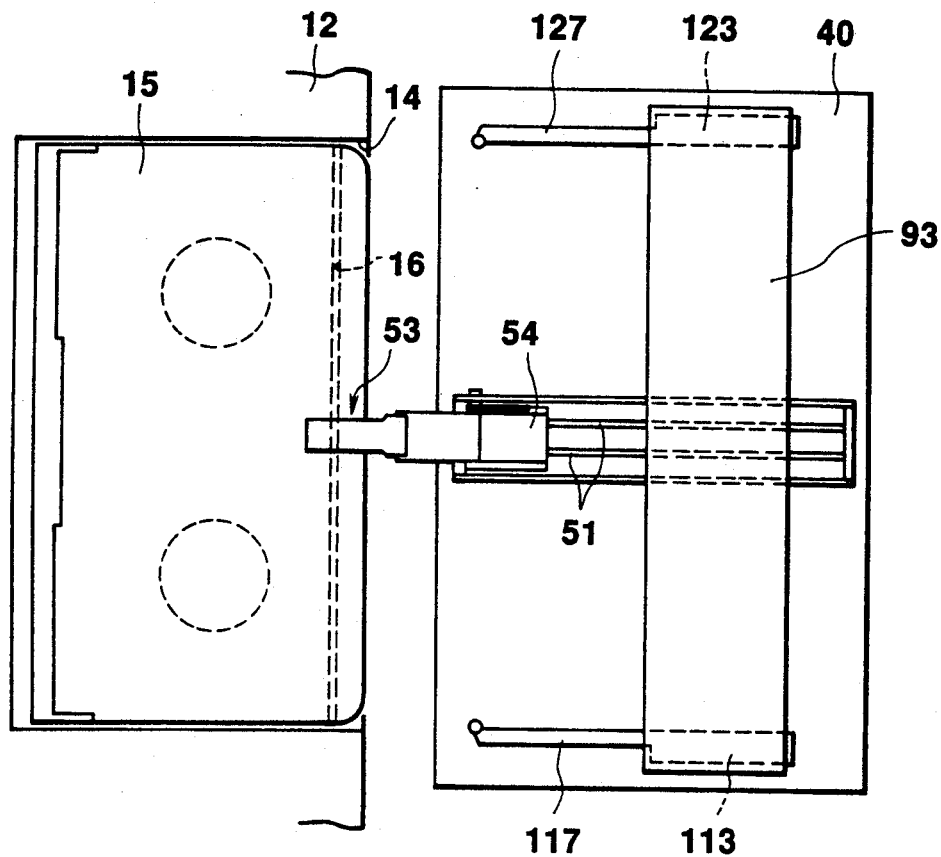
FIG. 23 is an enlarged side view used in explaining the cassette retracting operation of the invention.
Figure 24:
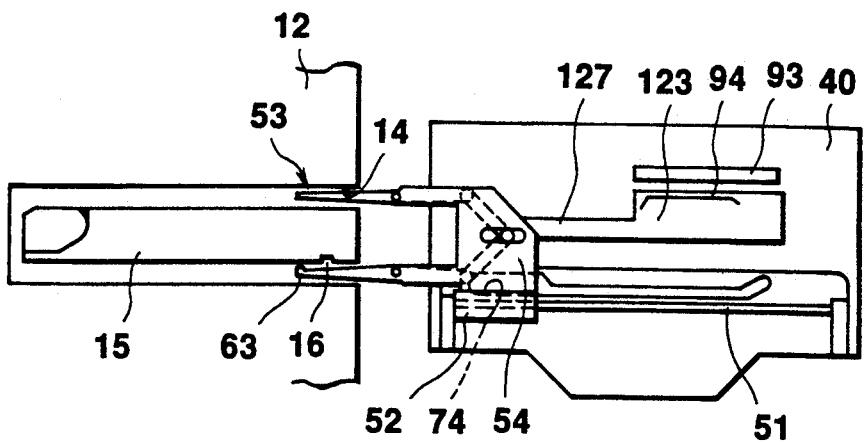
FIG. 24 is an enlarged plan view used in explaining the cassette retracting operation of the invention.
Figure 25:
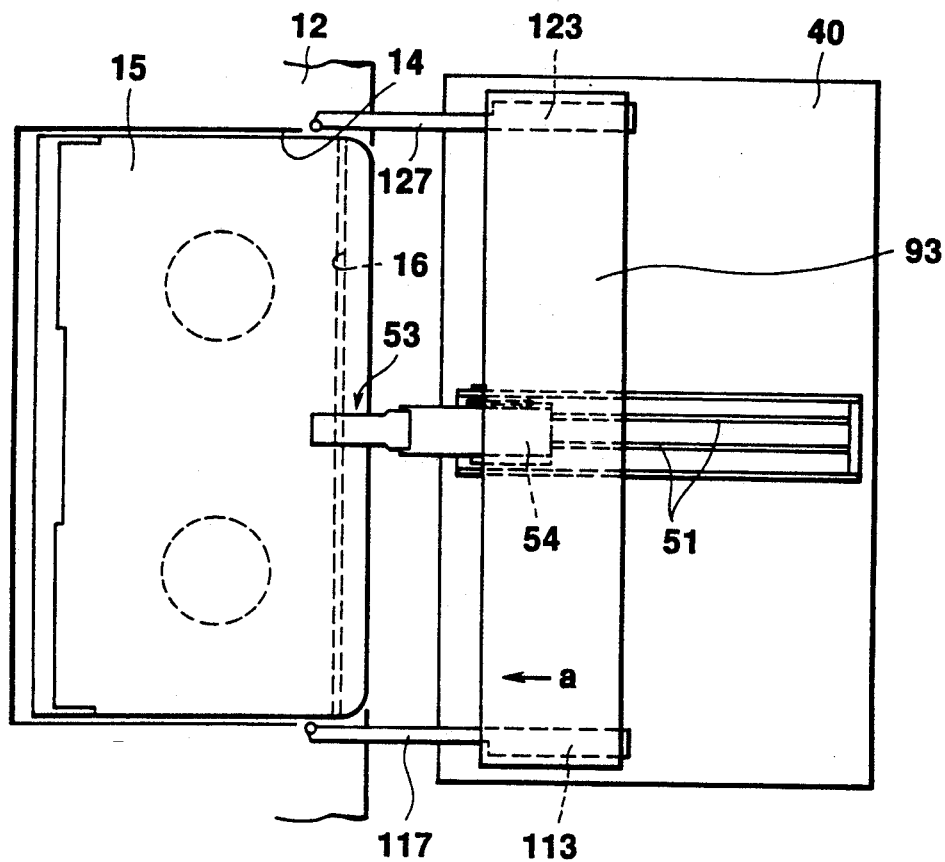
FIG. 25 is an enlarged side view used in explaining the cassette retracting operation of the invention.
Figure 26:
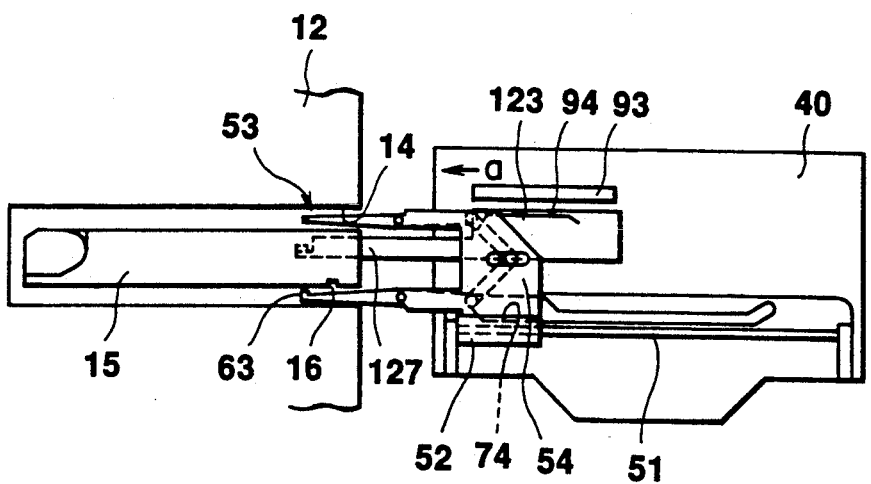
FIG. 26 is an enlarged plan view used in explaining the cassette retracting operation of the invention.

The cassette retracting operation of the tape cassette transfer mechanism 50 will be described. It is now assumed that the cassette holder 40 is placed in position with its cassette port 42 being in registry with the cassette port 14 for a desired tape cassette 15. In this position, the gripper 53 is at its rear position, the plate member 93 is at its rear position, and the arm members 113 and 123 are at the retracted positions, as shown in FIGS. 19 and 20. A control unit (not shown) produces a command operating the drive motor 85 to move the gripper 53 forward, in the direction indicated by the arrow a, as shown in FIGS. 21 and 22. When the guide roller 73 comes into the front end section $1_2$ of the cam slot 74, the upper and lower gripping elements 61 and 62 of the gripper 53 open wider. As shown in FIGS. 23 and 24, the gripper 53 moves further forwards to bring the upper and lower gripping elements 61 and 62 into the cassette container 12 through the cassette port 14. Following this, a command is produced to operate the drive motor 105 to move the plate member 93 forward, in the direction indicated by the arrow a, to its front position, as shown in FIGS. 25 and 26.

Figure 27:
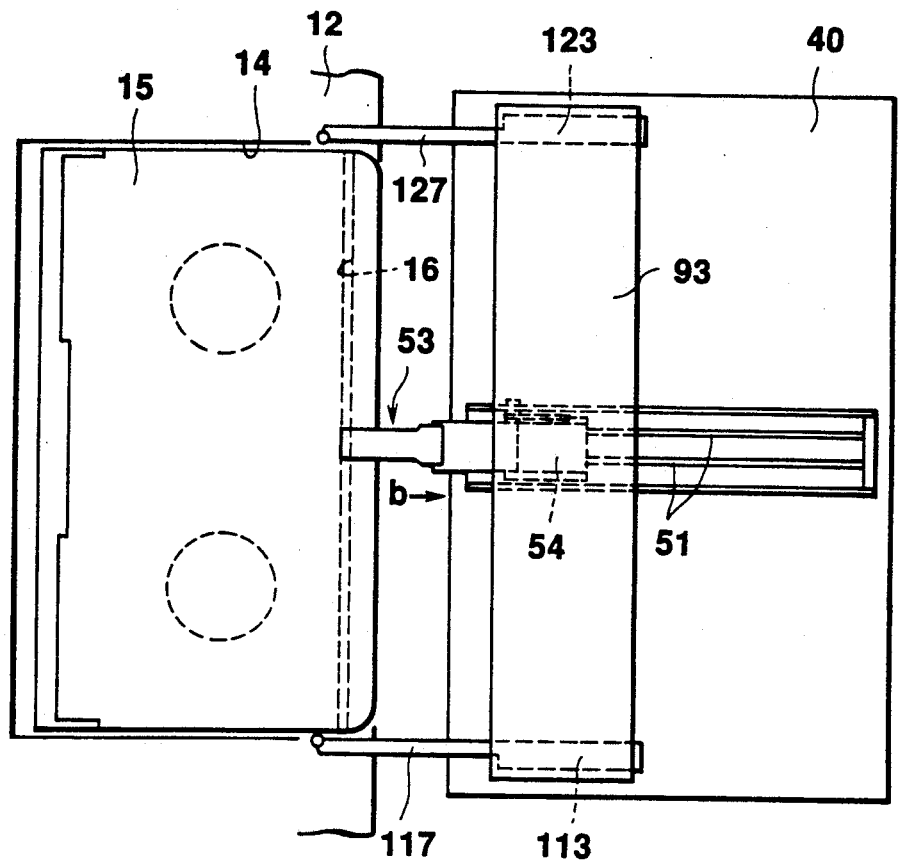
FIG. 27 is an enlarged side view used in explaining the cassette retracting operation of the invention.
Figure 28:
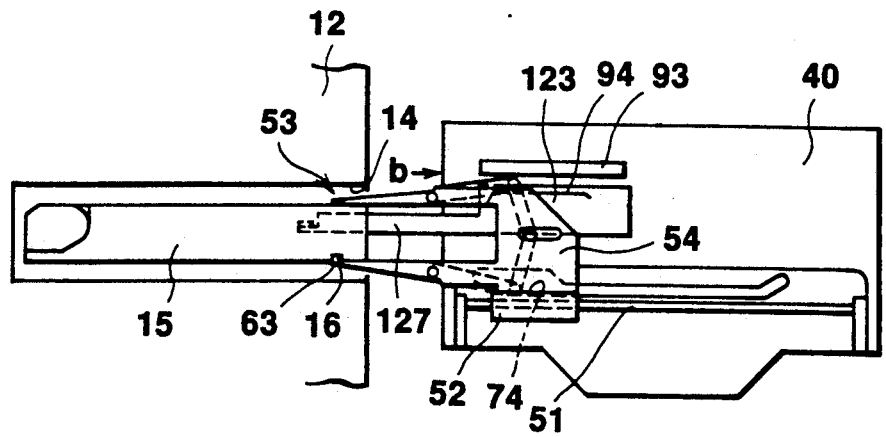
FIG. 28 is an enlarged plan view used in explaining the cassette retracting operation of the invention.
Figure 29:
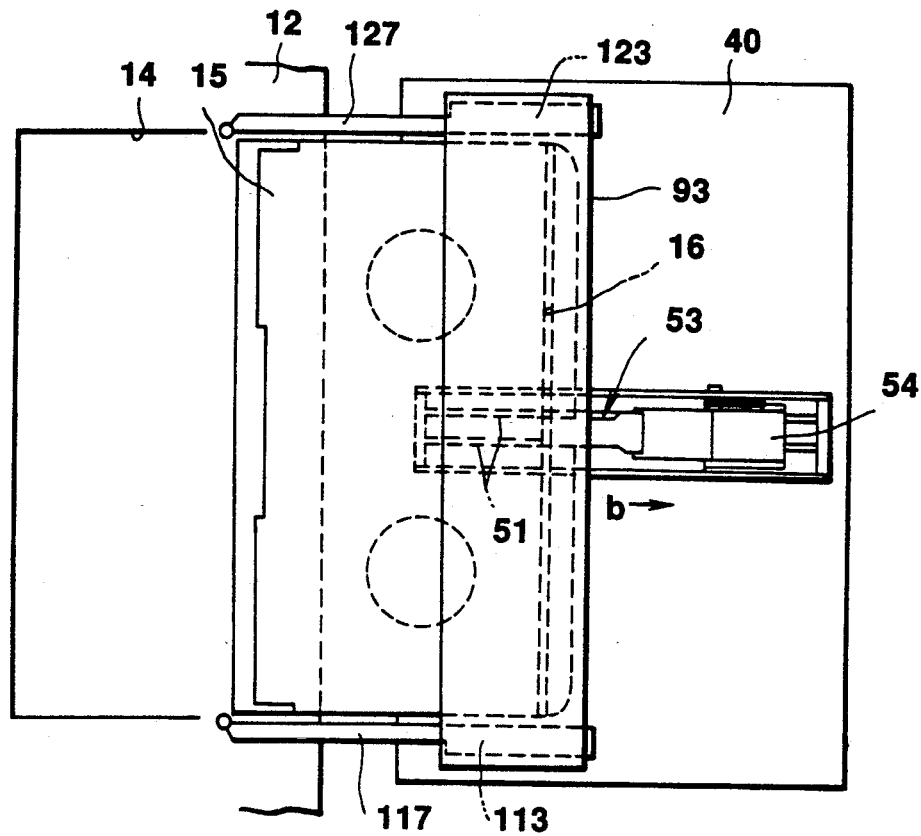
FIG. 29 is an enlarged side view used in explaining the cassette retracting operation of the invention.
Figure 30:
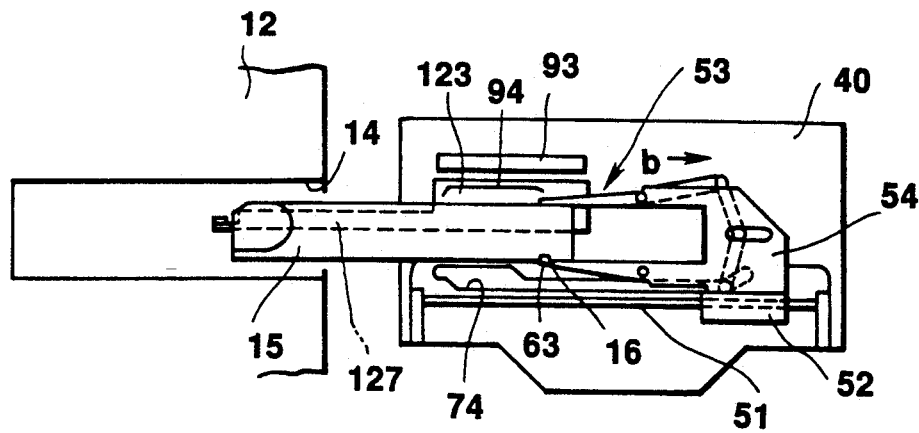
FIG. 30 is an enlarged plan view used in explaining the cassette retracting operation of the invention.
Figure 31:
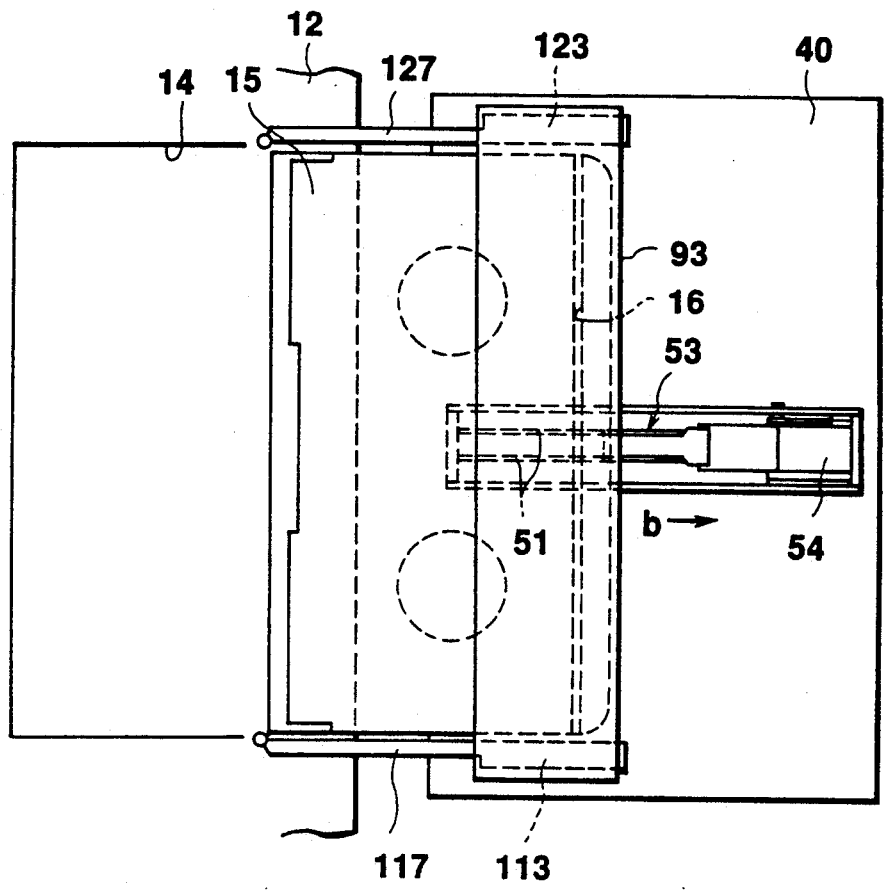
FIG. 31 is an enlarged side view used in explaining the cassette retracting operation of the invention.
Figure 32:
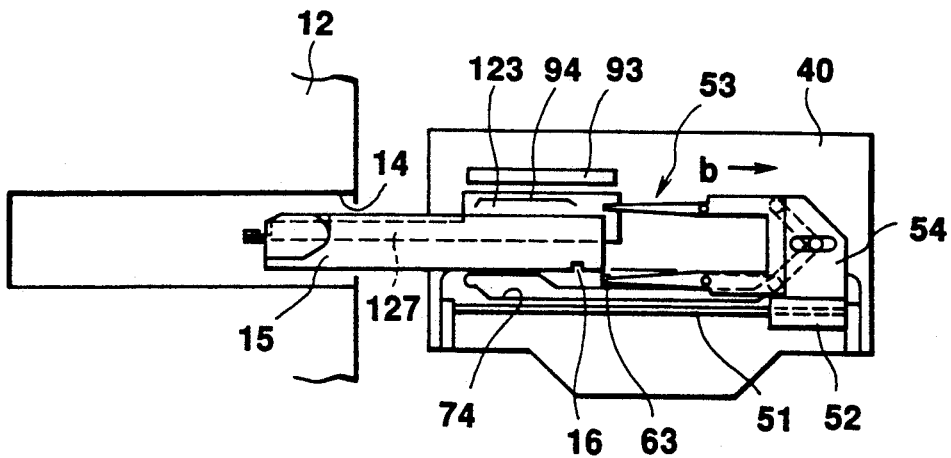
FIG. 32 is an enlarged plan view used in explaining the cassette retracting operation of the invention.

Following this, a command is produced to operate the drive motor 85 to move the gripper 53 rearward, in the direction indicated by the arrow b, so as to bring the guide roller 71 into engagement with the guide plate 94. When the guide roller 71 raises the inclined front surface 95 of the guide plate 94, the upper and lower gripping elements 61 and 62 of the gripper 53 close into pressure contact with the upper and lower surface of the cassette tape 15 so as to grip the tape cassette 15. Since the upper and lower gripping elements 61 and 62 are arranged to rotate against the resilient forces of the respective coil springs 58 and 60, they can grip the tape cassette 15 certainly even though their positions are somewhat deviated from the normal positions with respect to the tape cassette 15. When the gripper 53 moves further rearward, the hook 63 comes into engagement with the recess 16 formed in the lower surface of the tape cassette 15, as shown in FIGS. 27 and 28. The tape cassette 15 moves into the cassette holder 40 with the rearward movement of the gripper 53. In the course of this rearward movement of the gripper 53, the guide roller 71 comes out of engagement with the guide plate 94 and the guide roller 73 comes into the intermediate section $1_1$ of the cam slot 74. As a result, the upper and lower gripping elements 61 and 62 of the gripper 53 are held in position gripping the tape cassette 15 with the hook 63 being held in engagement with the recess 16, as shown in FIGS. 29 and 30. When the guide roller 73 comes into the rear end section $1_3$ of the cam slot 74, the upper and lower gripping elements 61 and 62 of the gripper 53 open wider to bring the hook 63 out of engagement with the recess 16. The gripper 53 moves further rearward to its rear position, as shown in FIGS. 31 and 32.

Figure 33:
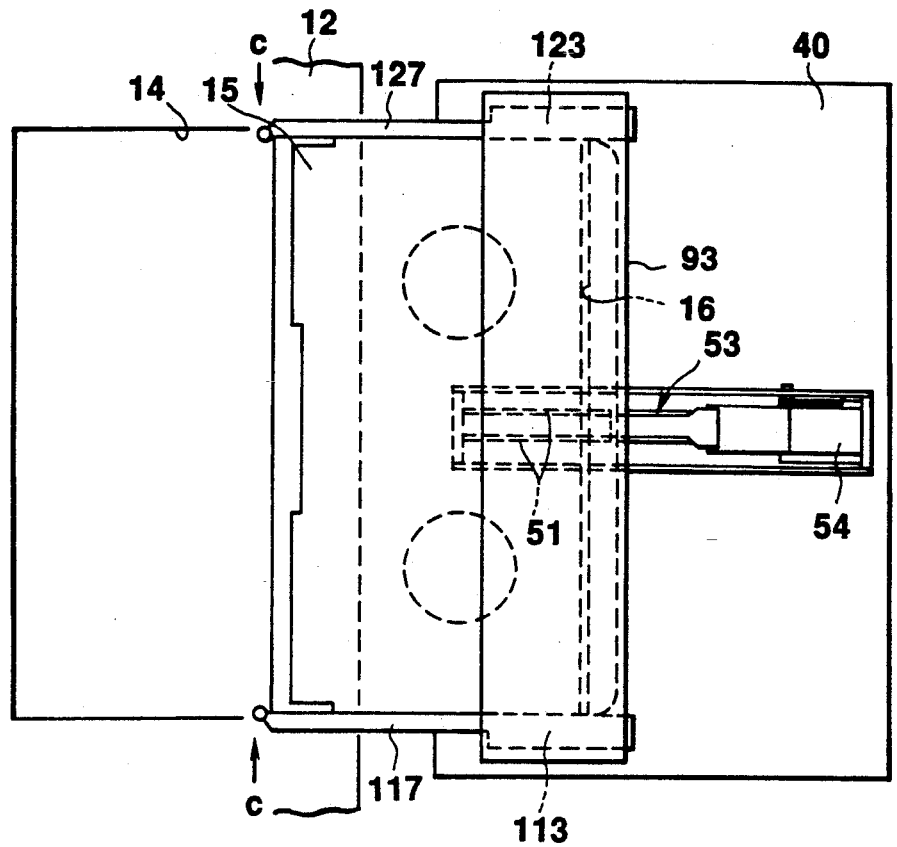
FIG. 33 is an enlarged side view used in explaining the cassette retracting operation of the invention.
Figure 34:
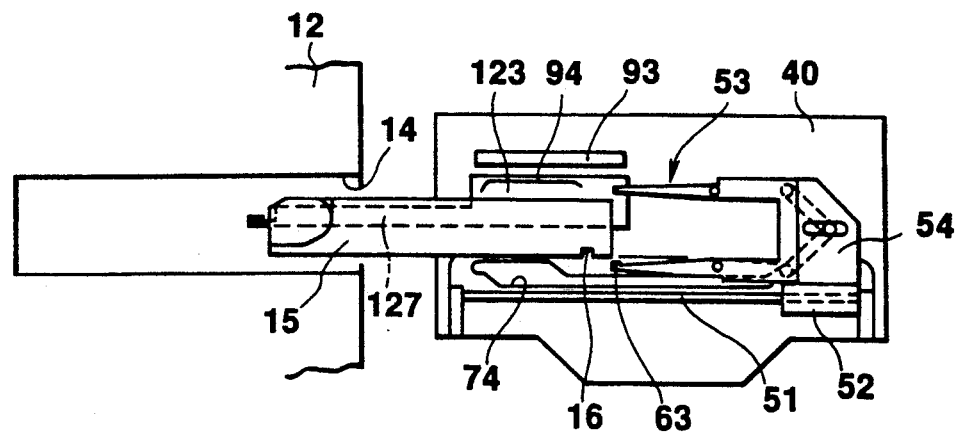
FIG. 34 is an enlarged plan view used in explaining the cassette retracting operation of the invention.
Figure 35:
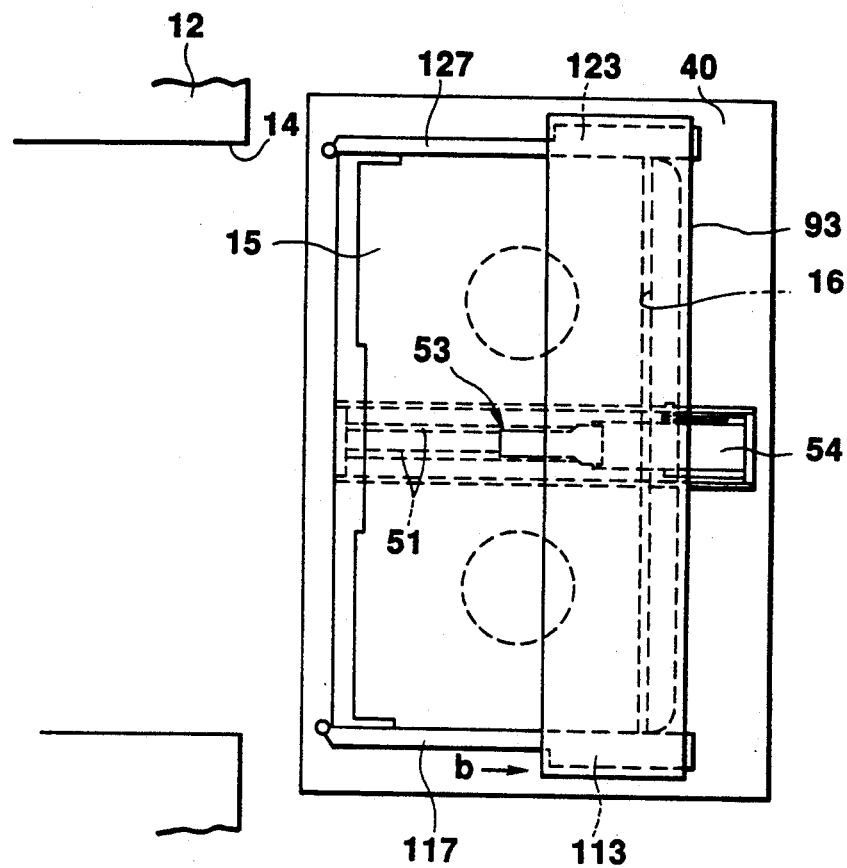
FIG. 35 is an enlarged side view used in explaining the cassette retracting operation of the invention.
Figure 36:
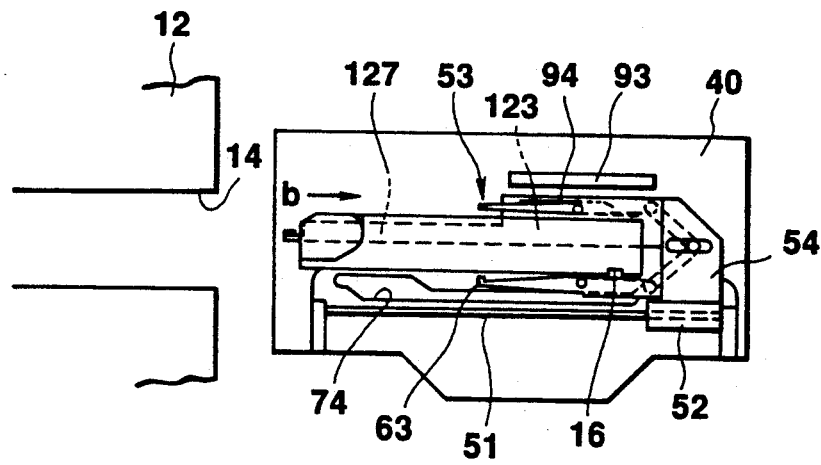
FIG. 36 is an enlarged plan view used in explaining the cassette retracting operation of the invention.

Following this, the control unit produces a command operating the drive motor 138 to move the arm members 113 and 123 toward each other, in the direction indicated by the arrow C, so as to grip the tape cassette 15, as shown in FIGS. 33 and 34. During this operation, the arm members 113 and 114 comes into pressure contact with the opposite sides of the tape cassette 15. When the arm members 113 and 123 move further toward each other, they rotate in the direction indicated by the arrow e of FIG. 14 against the resilient forces of the respective torsion coil springs 116 and 126. As a result, the arm members 113 and 123 can grip the tape cassette 15 under a constant force. The control unit then produces a command operating the drive motor 105 to move the plate members 93 to its rear position along with the tape cassette 15 held between the arm members 113 and 123, as shown in FIGS. 35 and 36. The tape cassette 15 is held between the arm members 113 and 123 after it is retracted into the cassette holder 40.

In order to transfer a tape cassette 15 from the cassette container 12 into the cassette holder 40, the tape cassette transfer mechanism 50 moves the tape cassette 15 at a distance L1 (FIG. 9) with the gripping elements gripping its upper and lower surface and at a distance L2 (FIG. 13) with the arm members 113 and 123 gripping its left and right side surfaces. The distance L1 of sliding movement of the gripper 53 overlaps the distance L2 of sliding movement of the plate member 93. This arrangement is effective to shorten the required width of the cassette holder 40. If the tape cassette 15 is inclined at a slight angle with respect to the cassette port 42 of the cassette holder 40, as shown in FIG. 18, the tape cassette 15 will come in abutment with guide rollers 153 and 163 positioned diagonally to move the roller frames 154 and 164 against the resilient forces of the respective coil springs 157 and 167 in directions permitting smooth insertion of the tape cassette 15 into the cassette chamber 41. Similar operations are performed to transfer a tape cassette 15 into the cassette holder 40 from the tape recorder/player unit 18.

Figure 37:
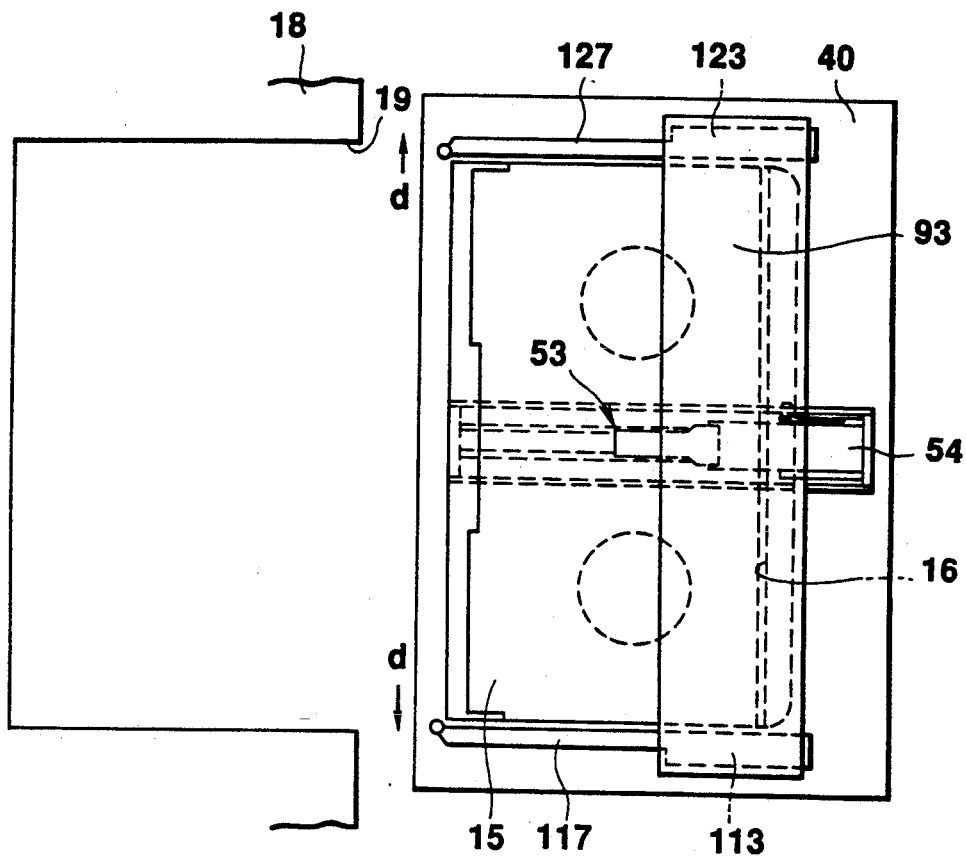
FIG. 37 is an enlarged side view used in explaining the cassette extruding operation of the invention.
Figure 38:
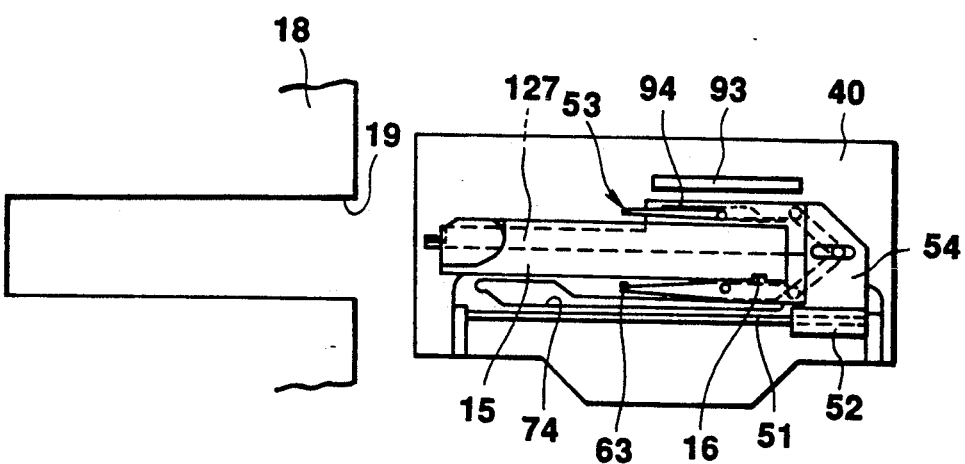
FIG. 38 is an enlarged plan view used in explaining the cassette extruding operation of the invention.
Figure 39:
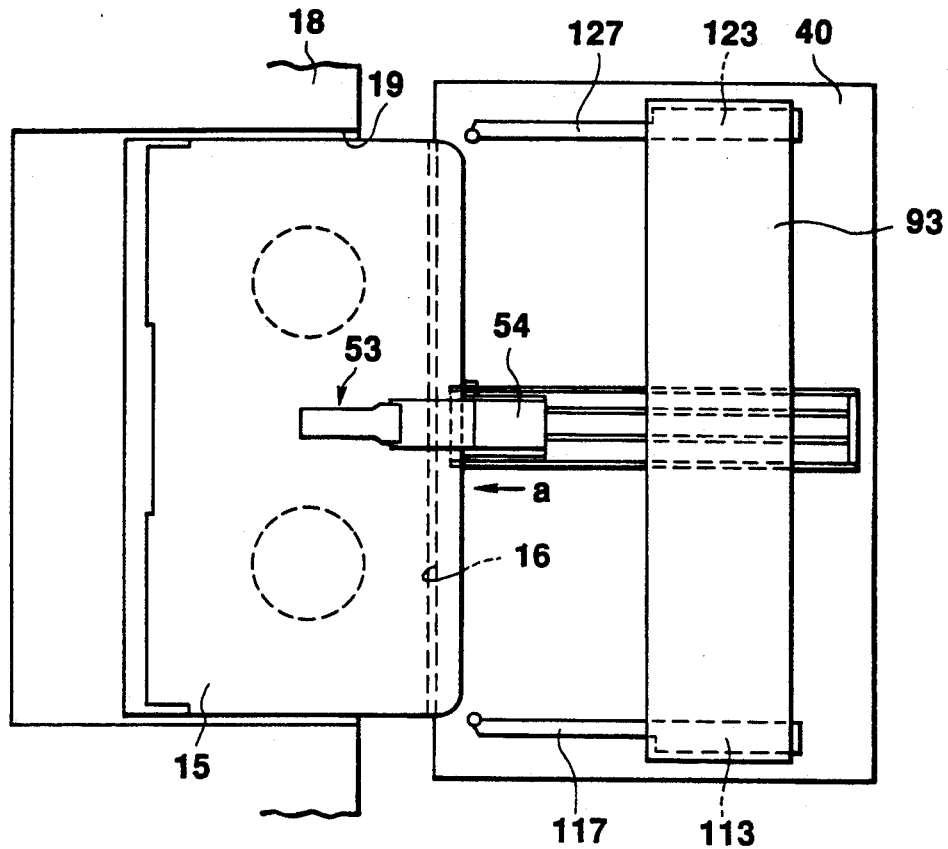
FIG. 39 is an enlarged side view used in explaining the cassette extruding operation of the invention.
Figure 40:
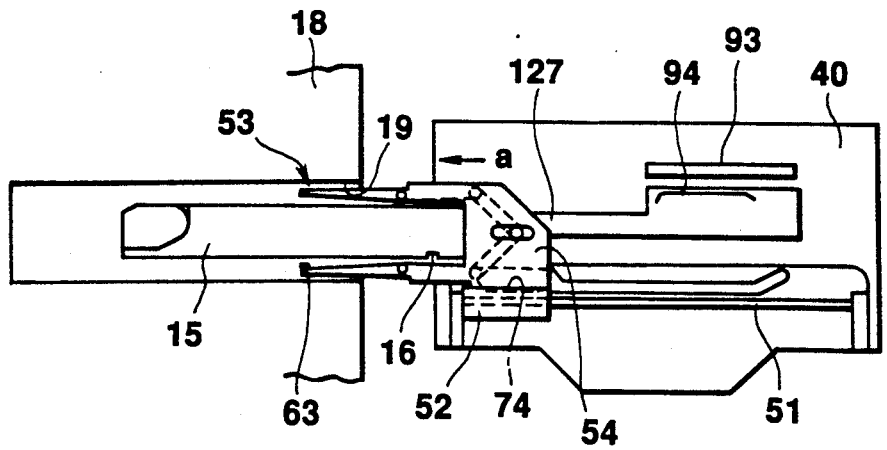
FIG. 40 is an enlarged plan view used in explaining the cassette extruding operation of the invention.
Figure 41:
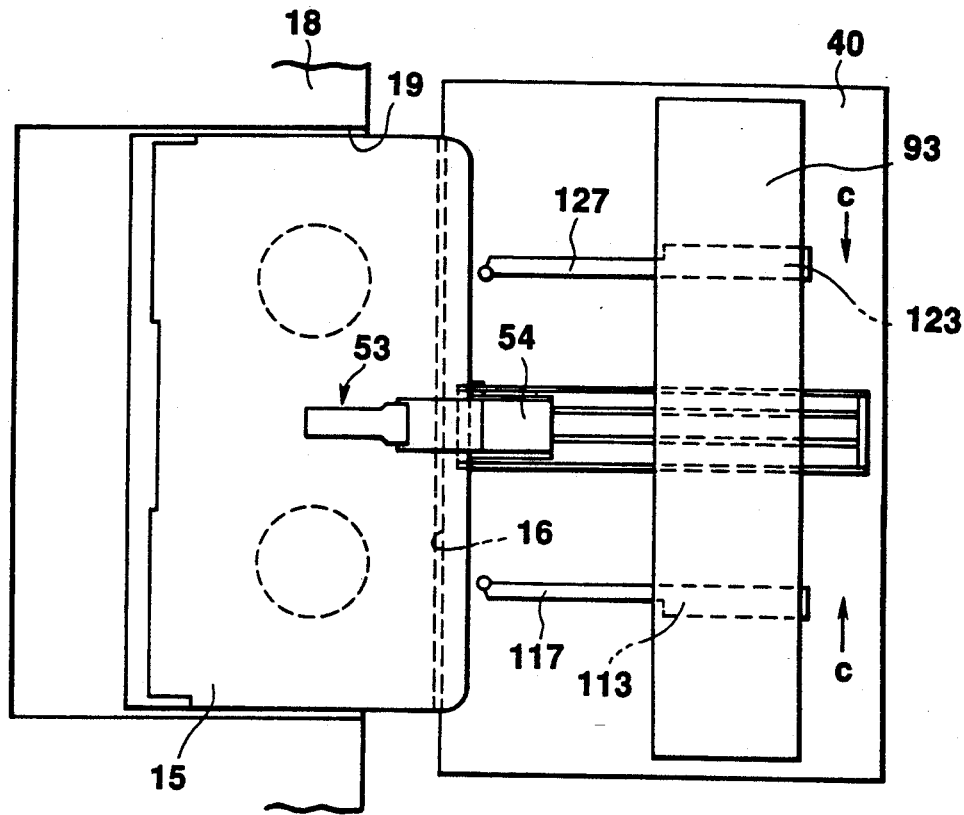
FIG. 41 is an enlarged side view used in explaining the cassette extruding operation of the invention.
Figure 42:
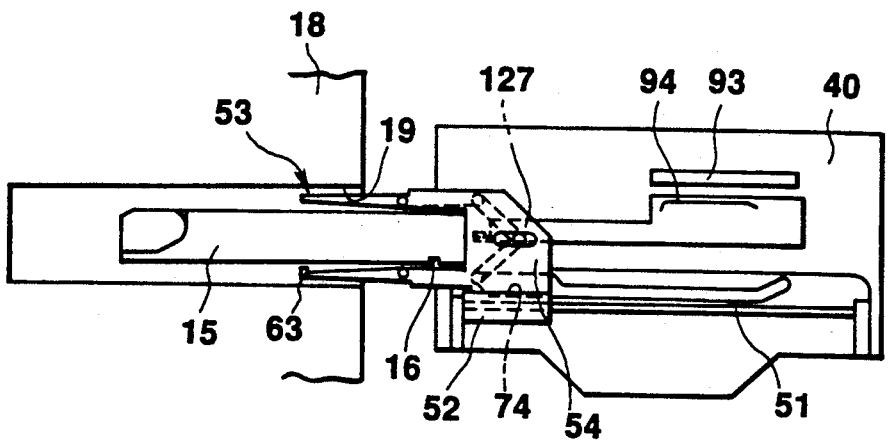
FIG. 42 is an enlarged plan view used in explaining the cassette extruding operation of the invention.
Figure 43:
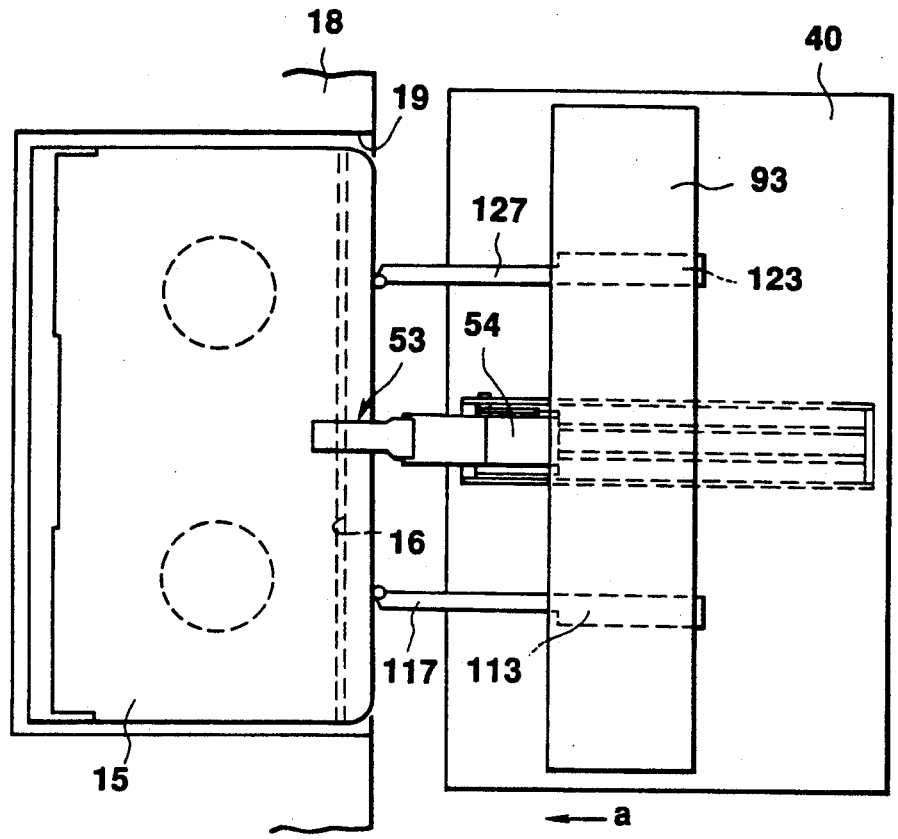
FIG. 43 is an enlarged side view used in explaining the cassette extruding operation of the invention.
Figure 44:
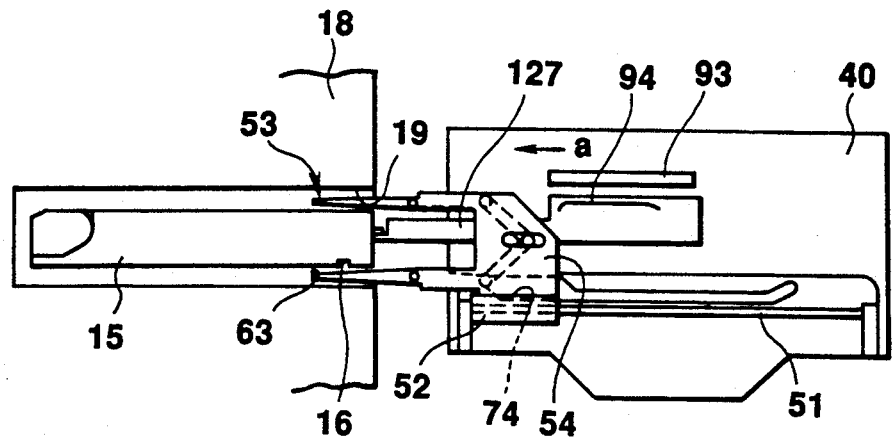
FIG. 44 is an enlarged plan view used in explaining the cassette extruding operation of the invention.
Figure 45:
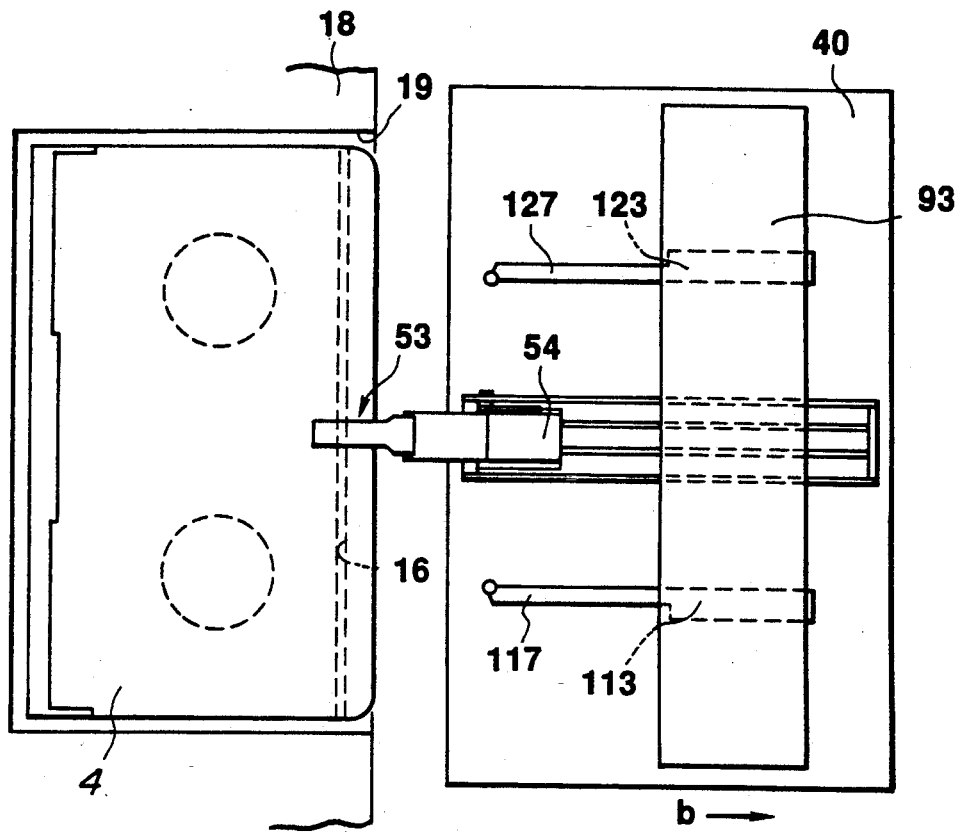
FIG. 45 is an enlarged side view used in explaining the cassette extruding operation of the invention.
Figure 46:
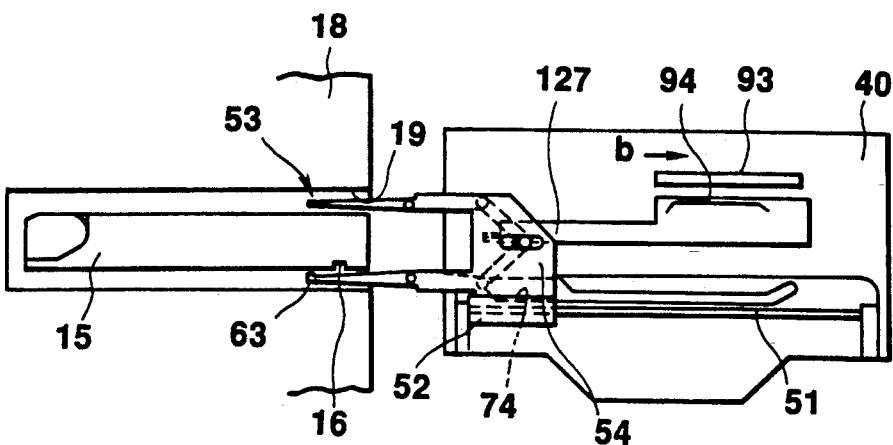
FIG. 46 is an enlarged plan view used in explaining the cassette extruding operation of the invention.

The cassette extruding operation of the tape cassette transfer mechanism 50 will be described. It is now assumed that the cassette holder 40 is placed in position with its cassette port 42 being in registry with the cassette port 19 of the tape recorder/player unit 18 for transfer a tape cassette 15 from the cassette holder 40 into the tape recorder/player unit 18. . In this position, the gripper 53 is at its rear position, the plate member 93 is at its rear position, and the arm members 113 and 123 are at the positions gripping the opposite side surfaces of the tape cassette 15. The control unit produces a command operating the drive motor 138 to move the arm members 113 and 123 away from each other, as shown in FIGS. 37 and 38. A command is then produced to operate the drive motor 85 to move the gripper 53 forward, in the direction indicated by the arrow a, to its front position, as shown in FIGS. 39 and 40, causing its front end to push the rear end of the tape cassette 15. Following this, a command is produced to operate the drive motor 138 to move the arm members 113 and 123 toward each other, in the directions indicated by the arrows c, to their extruded positions, as shown in FIGS. 41 and 42. A command is then produced to operate the drive motor 105 to move the plate member 95 forward, in the direction indicated by the arrow a, to its front position so as to cause the pushing rods 117 and 127 to push the tape cassette 15 into the tape recorder/player unit 18, as shown in FIGS. 43 and 44. The tape recorder/player unit 18 loads the inserted tape cassette in position. Following this, the control unit produces a command operating the drive motor 105 to move the plate member 95 rearward, in the direction indicated by the arrow b, to its rear position, as shown in FIGS. 45 and 46, a command operating the drive motor 138 to move the arm members 113 and 123 away from each other, in the directions indicated by the arrows d, to their retracted positions, and a command operating the drive motor 85 to move the gripper 53 rearward, in the direction indicated by the arrow b, to its retracted position. If the tape cassette 15 is inclined at a slight angle with respect to the cassette port 19 of the tape recorder/player unit 18, the pushing rods 117 and 127 will correct the inclined tape cassette position under the resilient forces of the coil springs 118 and 128. This arrangement is effective to permit smooth insertion of the tape cassette 15 into the tape recorder/player unit 18. Similar operations are performed to transfer a tape cassette 15 from the cassette holder 40 into the cassette container 12.

Although the lower gripping element 62 is formed on its inner surface with the hook 63 for engagement with the groove or recess formed in the lower surface of a tape cassette 15, it is to be understood that the hook may be formed on the inner surface of the upper gripping element 61 when the tape cassette 15 has a groove or recess in its upper surface. Alternatively, two hooks may be formed on the inner surface of the respective gripping elements 61 and 62 when a groove or recess is formed in each of the upper and lower surfaces of the tape cassette 15.

While the invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A cassette transfer unit associated with a cassette container having a cassette placed therein at a first position for transferring the cassette from and into said cassette container, said cassette transfer unit comprising:
    a cassette chamber for receiving the cassette at a second position;
    a carrying device provided in said cassette chamber for carrying the cassette from said cassette container into said cassette chamber and from said cassette chamber into said cassette container, said carrying device including first means slidable toward and away from said cassette container for retracting the cassette from the first position toward said cassette chamber to a third position, and a second means slidable toward and away from said cassette container for retracting the cassette away from said cassette container from the third position to the second position.

2. A cassette transfer unit according to claim 1, wherein said second means includes means for extruding the cassette from the second position toward said cassette container to the third position, and wherein said first means includes means for extruding the cassette from the third position to the first position.

3. A cassette transfer unit according to claim 2, wherein said first means includes means for gripping the cassette when said first means retracts the cassette from the first position to the third position, and wherein said second means includes means for gripping the cassette when said second means retracts the cassette from the third position to the second position.

4. A cassette transfer unit according to claim 3, wherein said first means includes upper and lower gripping elements for engagement with the upper and lower surfaces of the cassette, respectively, to grip the cassette when said first means retracts the cassette from the first position to the third position.

5. A cassette transfer unit according to claim 4, wherein said first means includes means for pushing the cassette when said first means extrudes the cassette from the third position to the first position.

6. A cassette transfer unit according to claim 4, further comprising control means for controlling a distance between said upper and lower gripping elements in relation to sliding movement of said first means.

7. A cassette transfer unit according to claim 6, wherein said control means includes a cam surface fixed to said cassette transfer unit and a cam follower fixed to said first means for engagement with said cam surface.

8. A cassette transfer unit according to claim 6, wherein said control means includes a cam surface fixed to said second means and a cam follower fixed to said first means for engagement with said cam surface.

9. A cassette transfer unit according to claim 6, wherein said control means includes a first cam surface fixed to said cassette transfer unit, a first cam follower fixed to said first means for engagement with said first cam surface, a second cam surface fixed to said second means and a second cam follower fixed to said first means for engagement with said second cam surface.

10. A cassette transfer unit according to claim 4, wherein a projection is formed at least on one of said upper and lower gripping elements for engagement with a recess formed in the corresponding one of the upper and lower surface of the cassette.

11. A cassette transfer unit according to claim 3, wherein said second means includes left and right holding arms for engagement with the left and right surface of the cassette to grip the cassette when said second means retracts the cassette from the third position to the second position.

12. A cassette transfer unit according to claim 11, wherein said left and right holding arms are movable toward and away from each other for gripping cassettes of different sizes.

13. A cassette transfer unit according to claim 12, wherein said second means includes means for holding said left and right holding arms in abutment with the left and right side surfaces of the cassette, respectively, when the cassette is at the second position.

14. A cassette transfer unit according to claim 1, further including means for changing said cassette transfer unit between vertical and horizontal postures.

15. A cassette transfer unit according to claim 4, wherein said first means includes a member positioned between said upper and lower gripping elements for movement in unison with said upper and lower gripping elements to push the cassette from the third position into said cassette container.

16. A cassette transfer unit according to claim 3, wherein said second means includes first and second pushing elements provided on said left and right holding arms, respectively, for pushing the cassette to the first position.

17. A cassette transfer unit according to claim 16, further comprising means for moving said first pushing element when said first pushing element is subject to a pressure exceeding a predetermined value, and means for moving said second pushing element when said second pushing element is subject to a pressure exceeding the predetermined value.

18. A cassette transfer unit according to claim 16, further comprising first and second resilient means for urging said first and second pushing element in a direction pushing the cassette toward said cassette container.

* * * * *